(12) United States Patent
Satou

(10) Patent No.: US 7,970,651 B2
(45) Date of Patent: Jun. 28, 2011

(54) SYSTEM FOR PRESENTING INFORMATION FOR COMMERCIAL ARTICLES PUT IN A BASKET USING ELECTRONIC TAG

(75) Inventor: Kazuo Satou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 102 days.

(21) Appl. No.: 12/435,470

(22) Filed: May 5, 2009

(65) Prior Publication Data
US 2009/0302106 A1    Dec. 10, 2009

(30) Foreign Application Priority Data
Jun. 4, 2008   (JP) ................. 2008-146644

(51) Int. Cl.
*G06Q 20/00*   (2006.01)
(52) U.S. Cl. ............. 705/23; 705/22; 705/14.38
(58) Field of Classification Search .......... 705/23, 705/22, 14.38; 235/383; 340/10.1
See application file for complete search history.

(56) References Cited

U.S. PATENT DOCUMENTS
7,443,295 B2 * 10/2008 Brice et al. ............. 340/568.5

FOREIGN PATENT DOCUMENTS
JP   2000-259947   9/2000
JP   2004-106827   4/2004

* cited by examiner

*Primary Examiner* — Ramsey Refai
(74) *Attorney, Agent, or Firm* — Staas & Halsey LLP

(57) ABSTRACT

A commercial article information presenting system includes a shopping basket device and a shopping server communicating with the shopping basket device. The shopping basket device acquires a tag ID from an electronic tag attached to a commercial article put in a shopping basket and transmits the tag ID to a shop server. The shop server stores the tag ID received from the shopping basket device, generates screen data for an itemization screen for indicating a commercial article identifier and a unit price corresponding to the stored tag ID, a total of unit prices. The shop server transmits the screen data for the itemization screen to the shopping basket device.

2 Claims, 29 Drawing Sheets

FIG. 5

63: COMMERCIAL ARTICLE INFORMATION MANAGEMENT TABLE

| COMMERCIAL ARTICLE ID | NAME OF COMMERCIAL ARTICLE | UNIT PRICE |
|---|---|---|
| fresh-fujiapple | FUJI APPLE | 100 |
| fresh-aritamikan | ARITA MANDARIN ORANGE | 200 |
| fresh-okayamamomo | OKAYAMA PEACH | 400 |
| ... | ... | ... |

| VIEW OF SELLING SPACE | TAG ID |
|---|---|
| fujiapple.jpg | 0003-1568-9426, ... |
| aritamikan.jpg | 0006-5986-4423, ... |
| okayamamomo.jpg | 0004-2697-8463, ... |
| ... | ... |

FIG. 6

64: PUT-IN COMMERCIAL ARTICLE LIST TABLE

| COMMERCIAL ARTICLE ID | NAME OF COMMERCIAL ARTICLE | UNIT PRICE | NUMBER OF PIECES |
|---|---|---|---|
| fish-sanma | PACIFIC SAURY | 100 | 2 |
| meet-gyubara | RIBS OF BEEF | 324 | 1 |
| cheese-12P | 12P OF CHEESES | 150 | 1 |
| ... | ... | ... | ... |

| TAG ID | TOTAL AMOUNT OF DISCOUNT |
|---|---|
| 0009-0031-2426, 0009-0031-2427 | - |
| 0005-4238-8026 | 50 |
| 0001-8324-3024 | - |
| ... | ... |

FIG. 8

66: PURCHASE DESIRE ADVERTISEMENT COMMERCIAL ARTICLE MANAGEMENT TABLE

| COMMERCIAL ARTICLE ID | NUMBER OF PIECES | AMOUNT OF DISCOUNT |
|---|---|---|
| fresh-tochigiichigo | 1 | 100 |
| fish-ibarakiankimo | 2 | 150 |
| beef-sukiyaki | 1 | 200 |
| ... | ... | ... |

| PUT-IN COMPLETION FLAG | ADVERTISEMENT CATEGORY FLAG | TIME ZONE |
|---|---|---|
| 0 | 0 | – |
| 1 | 0 | – |
| 0 | 1 | 16:30-17:30 |
| ... | ... | ... |

FIG. 9

68: SPECIFIED PURCHASE COUNT DISCOUNT COMMERCIAL ARTICLE MANAGEMENT TABLE

| COMMERCIAL ARTICLE ID | SPECIFIED COUNT | AMOUNT OF DISCOUNT | PUT-IN COUNT REACHING FLAG |
|---|---|---|---|
| tamago-L-10P | 2 | 20 | 0 |
| yogurt-plain | 3 | 10 | 0 |
| nattou-ootsubu-3P | 2 | 10 | 1 |
| ... | ... | ... | ... |

FIG. 10

69: PURCHASE RESERVATION COMMERCIAL ARTICLE MANAGEMENT TABLE

| COMMERCIAL ARTICLE ID | NUMBER OF PIECES | SECRET CODE NUMBER | DISCOUNT RATE |
|---|---|---|---|
| birthdaycake-M | 1 | 1234 | 10% |
| ... | ... | ... | ... |

SYSTEM FOR PRESENTING INFORMATION FOR COMMERCIAL ARTICLES PUT IN A BASKET USING ELECTRONIC TAG

CROSS-REFERENCE TO RELATED APPLICATION

This application is based upon and claims the benefit of priority of the prior Japanese Patent Application No. 2008-146644, filed on Jun. 4, 2008, the entire contents of which are incorporated herein by reference.

FIELD

An aspect of the present invention relates to a system for presenting commercial article (merchandise) information.

BACKGROUND

Patent document 1 discloses a scheme that electronic tags, each of which retains tag information such as a commercial article ID (Identification) and a unit price, are attached to commercial articles, while a client provided with a cart for carrying the commercial articles obtains the tag information from the electronic tag attached to commercial articles on the cart to register the tag information in a table, further obtains selling prices of the commercial articles from a server and totalizes the selling prices, and thereafter the information is displayed based on contents of the table on the screen.

Further, Patent document 2 discloses a scheme that an RF (Radio Frequency) tag, which retains commercial article information including prices, functions and a quantity of commercial articles and related commercial articles information, is attached to a commercial article or a label of the commercial article and a tag reader held in a shopping cart obtains the commercial article information from the RF tag, a total amount calculating unit calculates a total amount, and an information display unit displays the total amount and the commercial article information.

Thus, a conventional shopping basket device attached to the cart obtains information such as a price of commercial article and a function of the commercial article from the electronic tag to register the information in the table. The shopping basket device executes a lot of processes such as counting identical commercial articles, calculating a total amount, generating specification information, and generating screen data for screen display.

If the shopping basket device is configured to execute the lot of processes, however, a processing capability corresponding to the lot of processes is required of the shopping basket device. Hence, a size and a weight of the shopping basket device increase. Therefore, it leads to a problem that the shopping basket device resultantly reduces the capacity of the shopping basket of the cart. Moreover, if the shopping basket is of a portable type fitted with a handle, such a problem arises that the shopping basket is not carried offhand due to the weight of the shopping basket device.

"Patent document 1" Japanese Patent Laid-Open Publication No. 2000-259947 (Paragraphs 0025-0027)

"Patent document 2" Japanese Patent Laid-Open Publication No. 2004-106827 (Paragraphs 0034-0037) "Disclosure of the Invention"

SUMMARY

It is an object of one aspect of the present invention, which was devised in view of circumstances of the prior arts described above, to enable a processing load of a shopping basket device to be reduced.

One of aspects of the present invention is a commercial article information presenting system including:

a shopping basket device installed a shopping basket for putting one or more commercial articles each having an electronic tag therein, the electronic tag including a tag identifier for uniquely specifying the electronic tag; and a shop server capable of communicating with the shopping basket device via a network, the shopping basket device including:

an acquiring unit capable of acquiring the tag identifiers from electronic tags attached to the one or more commercial articles put in the shopping basket;

a first transmitting unit capable of transmitting the tag identifiers acquired by the acquiring unit to the shop server; and a display unit capable of displaying a screen based on screen data received from the shop server, the shop server including:

a storage capable of storing commercial article information blocks per commercial article, each of the commercial article information blocks containing a commercial article identifier for uniquely specifying the commercial article, a unit price of the commercial article and a tag identifier group of the electronic tags attached to identical commercial articles;

a generating unit capable of generating, when receiving the tag identifiers of the electronic tags, which are attached to the one or more commercial articles, transmitted by the first transmitting unit, screen data for displaying an itemization screen, the itemization screen indicating commercial article identifiers and unit prices in at least one of the commercial article information blocks corresponding to the tag identifiers received and indicating a total of the unit prices; and a second transmitting unit capable of transmitting the screen data generated by the generating unit to the shopping basket device.

With this configuration, it follows that the shopping basket device executes only a process of reading the tag identifying information from the electronic tag in the shopping basket and a process of displaying the screen based on the screen data, while the shop server device executes other many processes such as managing the tag identifying information read from the electronic tag by the shopping basket device, reading the unit price, totalizing the total amounts and generating the screen data.

It should be noted that the operations related to the commercial article presenting system can be realized by a commercial article presenting method or a commercial article presenting program. Namely, the present invention may be a commercial article presenting method by which the shopping basket device and the shop server device execute the same functions as those of the commercial article presenting system by way of a plurality of steps, and may also be a commercial article presenting program for making the shopping basket device and the shop server device function as a plurality of means equal to those respective units. Moreover, the present invention may also be a readable-by-computer medium stored with such a commercial article presenting program.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 is a diagram illustrating a commercial article information management table in the embodiment;

FIG. 6 is a diagram illustrating a put-in commercial article list table in the embodiment;

FIG. 8 is a diagram illustrating a purchase desire advertisement commercial article management table of the embodiment;

FIG. 9 is a diagram illustrating a specified purchase count discount commercial article management table in the embodiment;

FIG. 10 is a diagram illustrating a purchase reserved commercial article management table in the embodiment;

DESCRIPTION OF EMBODIMENTS

A shop system of an embodiment will hereinafter be described with reference to the accompanying drawings.

<<Configuration>>

Figure 1:
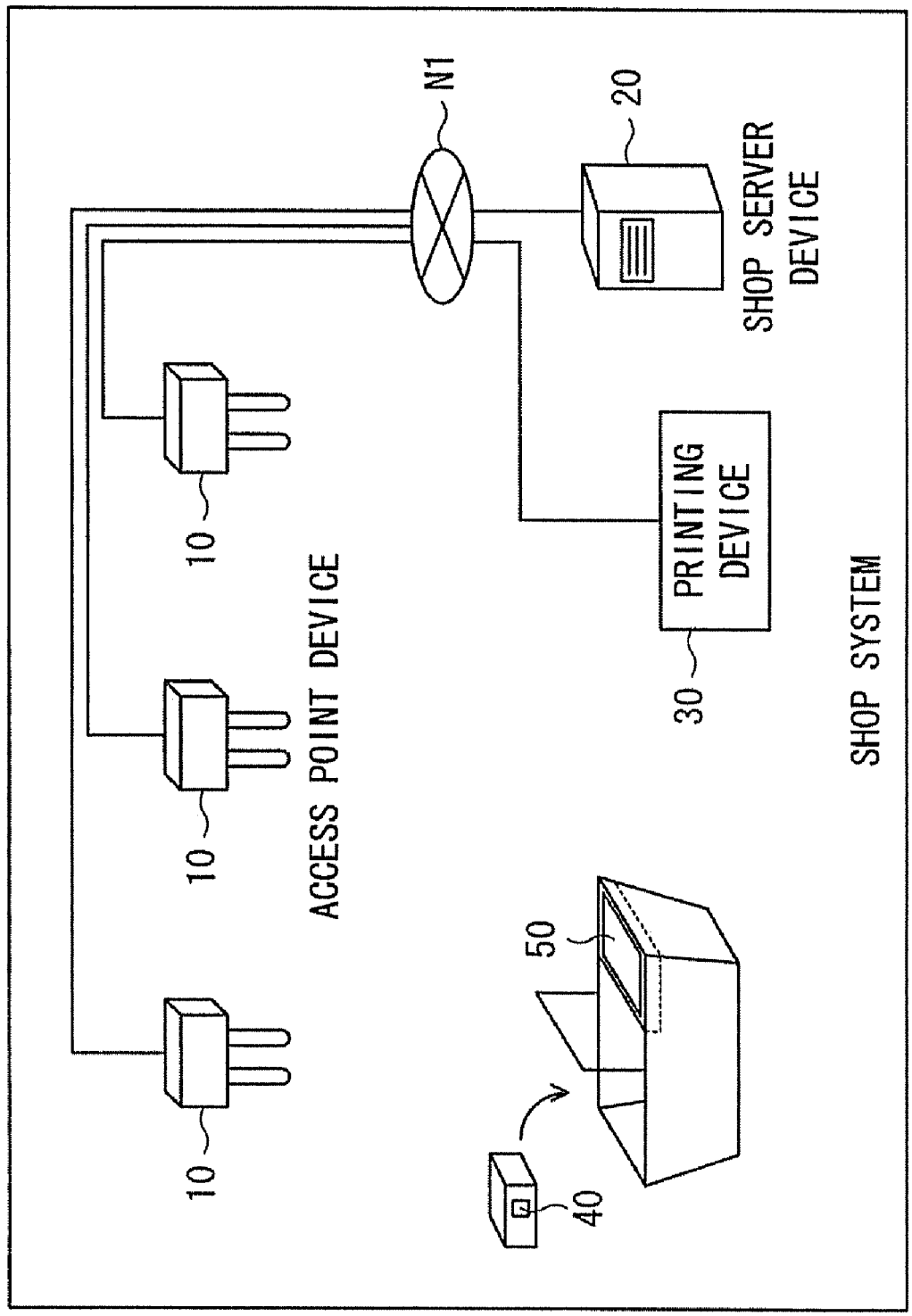
FIG. 1 is a diagram illustrating a shop system in an embodiment.

FIG. 1 is a diagram of a shop system of the embodiment.

As illustrated in FIG. 1, the shop system in the embodiment includes an access point device (access point) 10, a shop server device (shop server) 20, a printing device 30, an electronic tag 40 and a shopping basket device (shopping basket apparatus) 50. Among these elements, the shop server device 20 is cable-connected to the access point device 10 and the printing device 30 via a network N1 to communicate with the access point device 10 and the printing device 30.

The access point device 10 is a relay device to establish radio communications with computers within a communication area of the access point to configure a LAN (Local Area Network) between the computers within the communication area or between the computers within the communication area and other computers in a different network. The access point device 10 is, for example, a radio LAN router. A plurality of access point devices are disposed in a shop (premise) disposed with the shop system of the embodiment so that the communication areas of the plurality of access point devices are not excessively overlapped with each other.

Note that in the following description, the communication area including a counter (which is a so-called "cash register counter") in the plurality of communication areas configured by the plurality of access point devices 10 within the shop, is particularly referred to as a "counter area".

The shop server device 20 is performs communications with the shop basket device 50 via the access point device 10 to manage the shop basket device 50. The shop server device 20 is installed in a room which only, e.g., shop clerks (employees for the shop) are permitted to enter. A hardware configuration and a software configuration of the shop server device 20 will be described later on with reference to FIG. 3.

The printing device 30 is a device for executing a print on a predetermined sheet of paper based on print data. The printing device 30 is installed on a one-by-one basis at the counter within the shop. In the embodiment, the print data is output to the printing device 30 from the shop server device 20.

The electronic tags 40 are devices to manage commercial articles or commercial articles displayed in the shop. The electronic tags 40 are attached on the one-by-one basis to all of the commercial articles within the shop. The electronic tag 40 is, though not illustrated, constructed mainly of a coil antenna and a control circuit including a nonvolatile memory. The coil antenna is a circuit to transmit and receive radio waves to and from the shopping basket device 50. The coil antenna also supplies electric power to the control circuit by generating an induced electromotive force with the radio waves transmitted from the shopping basket device 50. The control circuit is a circuit accepts a request from the shopping basket device 50 via the coil antenna to read a tag ID (Identification) in the nonvolatile memory and to transmit the tag ID to the shopping basket device 50 via the coil antenna. Note that the tag ID is apiece of tag identifying information for uniquely specifying the electronic tag 40. In the electronic tag 40 according to the embodiment, only one tag ID is stored in the nonvolatile memory included in the control circuit. Accordingly, it follows that tag IDs are uniquely allocated individually to all of the commercial articles within the shop.

The shopping basket device 50 is a device which acquires the tag ID from the electronic tag 40 attached to the commercial article put in the shopping basket to transfer the tag ID to the shop server device 20. The shopping basket device 50 displays a screen based on screen data transmitted from the shop server device 20. In the embodiment, the shopping basket device 50 is attached to a portable type of shopping basket with a handle, per shopping basket.

Figure 2:
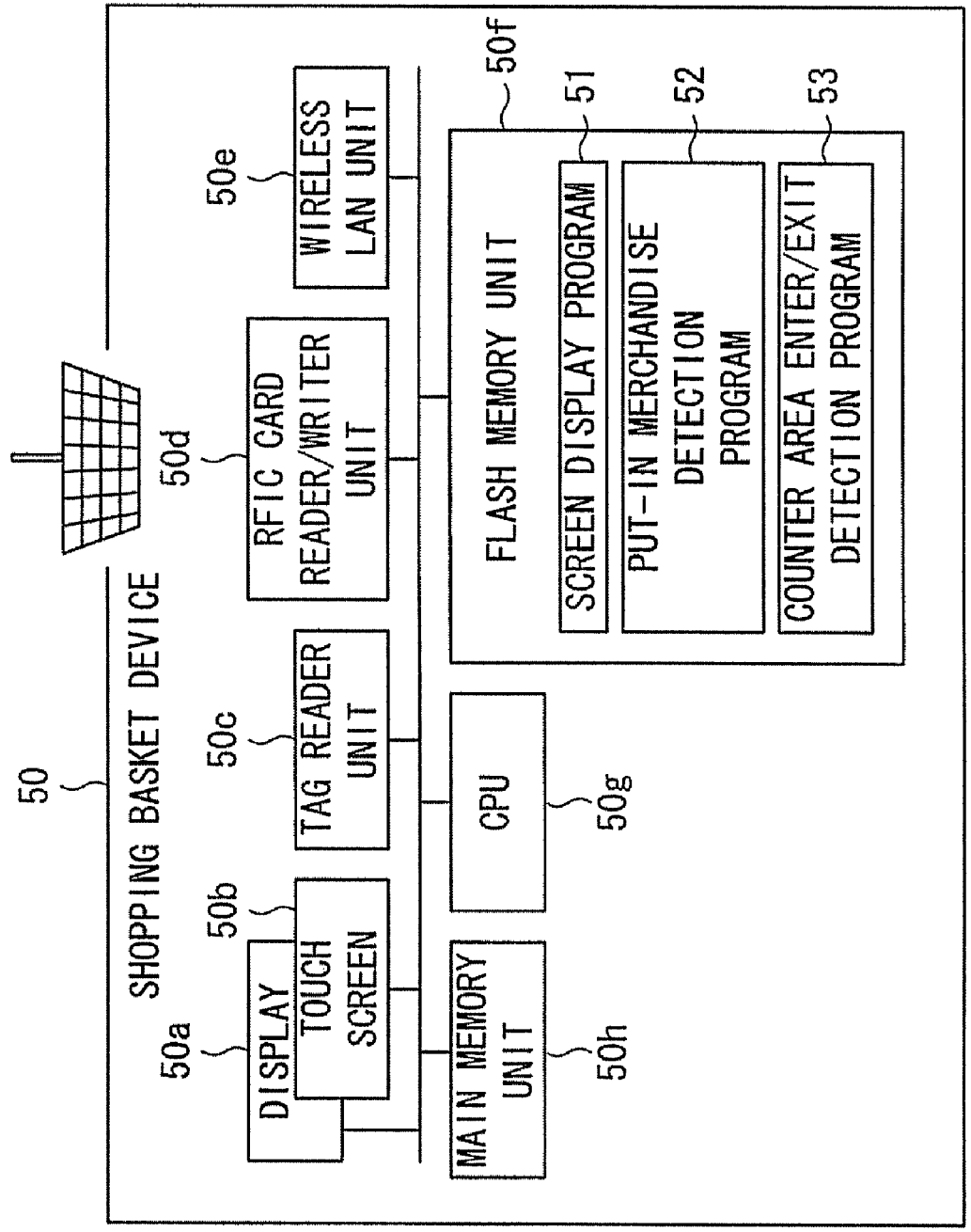
FIG. 2 is a diagram illustrating a configuration of a shop basket device in the embodiment.

FIG. 2 is a diagram of a configuration of the shopping basket device 50.

As illustrated in FIG. 2, the shopping basket device 50 includes a display unit 50a, a touch screen unit 50b, a tag reader unit 50c, a Radio Frequency Integrated Circuit (RFIC) card reader unit 50d, a wireless Local Area Network (LAN) unit 50e, a flash memory unit 50f, a Central Processing Unit (CPU) 50g and a main memory unit 50h.

The display unit 50a is a unit to display the screen based on the screen data. The touch screen unit 50b is a unit to detect a point pressed by an operator from within the screen displayed by the display unit 50a. Note that the display unit 50a and the touch screen unit 50b construct a touch panel unit.

The tag reader unit 50c is a unit to read the tag ID stored in the electronic tag 40. Specifically, the tag reader unit 50c transmits the radio waves including information indicating a request to transmit the tag ID to the electronic tag 40. If the tag reader unit 50c is capable of receiving radio waves as a response from the electronic tag 40, the tag reader unit 50c acquires the tag ID carried on the radio waves.

The RFIC card reader unit 50d is a unit to transmit and receive the radio waves including information to and from an RFIC card (a non-contact type IC card).

The wireless LAN unit 50e is a unit to transmit and receive the radio waves including data to and from the access point device 10 according to wireless communication standards such as IEEE802.11a, IEEE802.11b and IEEE802.11g. The wireless LAN unit 50e, when the shopping basket device 50 including the wireless LAN unit 50e enters the communication area of any one of the access point devices 10, establishes a wireless connection with the access point device 10 according to the wireless communication standards.

The flash memory unit 50f is a unit to record a variety of programs and data. The CPU 50g is a unit to execute processes based on the programs in the flash memory unit 50f. The main memory unit 50h is a unit in which the CPU 50g caches the programs and the data and expands an operation area.

The shopping basket device 50 stores, in the flash memory unit 50f, a screen display program 51, a put-in commercial article detection program 52 and a counter area enter/exit detection program 53.

The screen display program 51 is a program for displaying the screen based on the screen data transmitted from the shop server device 20. Details of the processes executed by the CPU 50g according to the screen display program 51 will be described later on with reference to FIG. 11.

The put-in commercial article detection program 52 is a program for acquiring the tag ID from the electronic tag 40 attached to the commercial article inputted into the shopping basket and transferring the tag ID to the shop server device 20. Details of the processes executed by the CPU 50g according to the input commercial article detection program 52 will be described later on with reference to FIG. 16.

The counter area enter/exit detection program 53 is a program for detecting whether or not the shopping basket device 50 enters and exits the counter area. Details of the processes executed by the CPU 50g according to the counter area enter/exit detection program 53 will be described later on with reference to FIG. 22.

Figure 3:
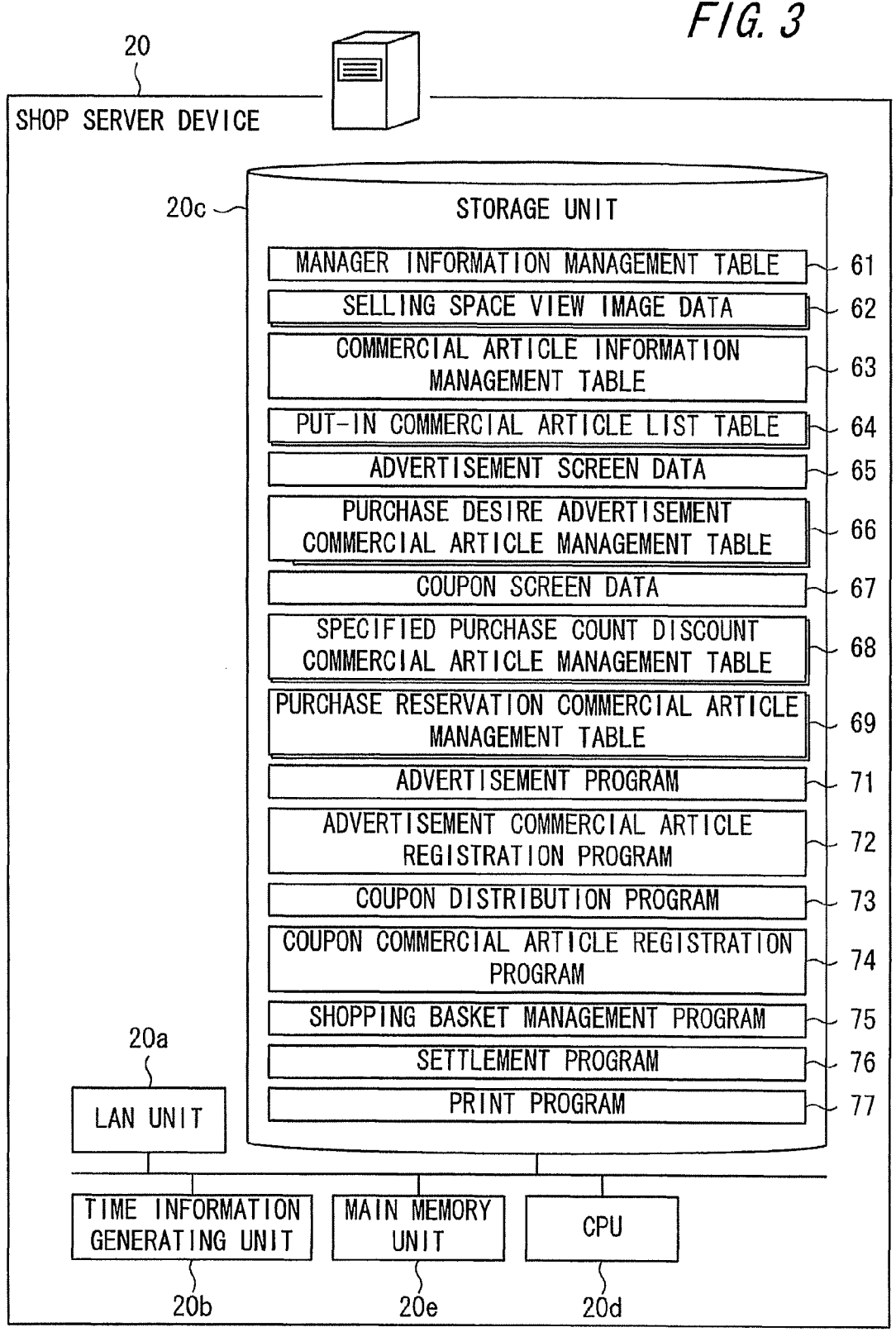
FIG. 3 is a diagram illustrating a configuration of a shop server device in the embodiment.

FIG. 3 is a diagram of a configuration of the shop server device 20 in the embodiment.

As illustrated in FIG. 3, the shop server device 20 includes a LAN unit 20a, a time information generating unit 20b, a storage unit 20c, a CPU 20d and a main memory unit 20e.

The LAN unit 20a is a unit to transmit and receive the data to and from other computers connected to the LAN. Note that the LAN includes an unillustrated LAN cable, a relay device (a computer with a relay function, such as a router) and the access point device 10, which configure the network N1.

The time information generating unit 20b is a unit to generate time information representing the present time.

The storage unit 20c is a unit to record the variety of programs and the data. The CPU 20d and the main memory unit 20e exhibit the same functions as those of the shopping basket device 50.

The shop server device 20 stores a manager information management table 61 in the storage unit 20c. The manager information management table 61 is a table to manage the information on the employees permitted to work for a settling operation at the counter.

Figure 4:
FIG. 4 is a diagram illustrating a manager information management table in the embodiment.

FIG. 4 is a diagram illustrating the manager information management table 61 in the embodiment.

As illustrated in FIG. 4, each of records of the manager information management table 61 includes fields such as a "manager ID" and a "name". The "manager ID" field is a field to record a manager ID. The manager IDs are uniquely assigned to the employees permitted to work for the settling operation at the counter. The "name" field is a field to record a name of an employee who is permitted to work for the settling operation at the counter.

Further, the shop server device 20 stores, as illustrated in FIG. 3, selling space view image data 62 in the storage unit 20c. The selling space view image data 62 is image data to display an image of a view of the selling space showing a location of one selling space for one of the whole commercial articles displayed within the shop and a route to the location. Incidentally, the shop server device 20 is stored with the selling space view image data 62 with respect to each of the whole commercial articles displayed within the shop.

Moreover, the shop server device 20 stores, as illustrated in FIG. 3, a commercial article information management table 63 in the storage unit 20c. The commercial article information management table 63 is a table to manage the commercial article information about the commercial articles displayed in the shop.

FIG. 5 is a diagram illustrating the commercial article information management table 63 in the embodiment.

As illustrated in FIG. 5, each of records of the commercial article information management table 63 includes fields such as a "commercial article ID", a "name of commercial article", a "unit price", a "view of selling space" and a "tag ID". The "commercial article ID" field is a field to record the commercial article ID defined as identifying information of the commercial article for uniquely specifying the commercial article. The "name of commercial article" field is a field to record a name of the commercial article. The "unit price" field is a field to record a unit price of the commercial article. The "view of selling space" field is a field for indicating a location of the image data of the view of the selling space for the commercial article. The "tag ID" field is a field to record the tag IDs of all of the electronic tags 40 attached to the commercial articles.

Note that the storage unit 20c stored with the commercial article information in the commercial article information management table 63 corresponds to the storage unit described above.

Further, the shop server device 20 stores, as illustrated in FIG. 3, article put-in commercial article list table 64 in the storage unit 20c. The put-in commercial article list table 64 is a table to manage the information on the commercial articles put in the shopping basket. Incidentally, the shop server device 20 is stored with the put-in commercial article list table 64 with respect to each of all of the shopping baskets provided in the shop. Moreover, a corresponding shopping basket ID is allocated to each put-in commercial article list table 64. The shopping basket ID is the identifying information of the shopping basket for uniquely specifying the shopping basket and the shopping basket device 50.

FIG. 6 is a diagram schematically showing the put-in commercial article list table 64 in the embodiment.

As shown in FIG. 6, each of records of the put-in commercial article list table 64 consists of fields such as a "commercial article ID", a "name of commercial article", a "unit price", a "number of pieces", a "tag ID" and a "total amount of discount". The "commercial article ID" field, the "name of commercial article" field and the "unit price" field are fields recorded with the commercial article ID, the name and the unit price of the commercial article, respectively. The "number of pieces" field is a field to record the number of pieces. The "tag ID" field is a field to record the tag IDs of the electronic tags 40 put in the shopping basket in the tag IDs of all of the electronic tags 40 attached to the commercial articles. The "total amount of discount" field is a field to record a total amount of discount that is subtracted from a subtotal of the commercial articles when in the settlement of the commercial articles.

Further, as illustrated in FIG. 3, the shop server device 20 stores advertisement screen data 65 in the storage unit 20c. The advertisement screen data 65 is screen data for displaying an advertisement screen presented to a purchaser carrying the shopping basket.

Figure 7:
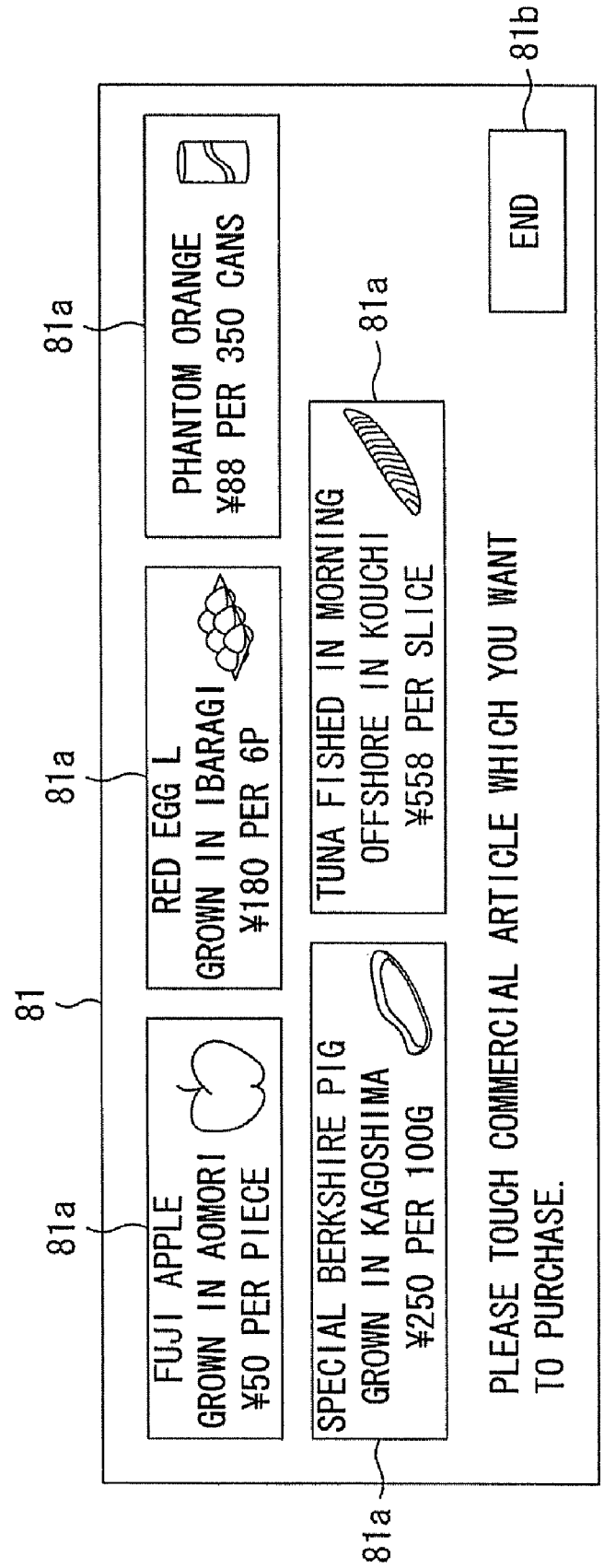
FIG. 7 is a diagram illustrating an example of an advertisement screen in the embodiment.

FIG. 7 is a diagram illustrating one example of an advertisement screen 81 displayed based on the advertisement screen data 65.

As illustrated in FIG. 7, the advertisement screen 81 contains one or more commercial article buttons 81a and an end button 81b. The advertisement screen 81 may contain two types of commercial article buttons 81a. A purport that a corresponding commercial article is a low-price bargain article and a purport of being notified that the bargain article fails to be bought when making the settlement, are described in the first type of commercial article button 81a. The commercial article ID, an advertisement category flag and an amount of discount per piece are embedded in the commercial article button 81a. A purport that a corresponding commercial article is a time-limited special offer article that a price of the corresponding commercial article is discounted if the corresponding commercial article put in the shopping basket within a predetermined time zone, and a purport of being notified that the time-limited special offer service is started at proper timing, are described in the second type of commercial article button 81a The commercial article ID, the advertisement category flag and a time zone and the amount of discount per piece are embedded in the commercial article button 81a. Note that the advertisement category flag is information for defining whether the advertisement commercial article is the bargain article or the time-limited special offer article. In the embodiment, if the advertisement category flag is "1", a definition is that the advertisement commercial article is the time-limited special offer article. Moreover, the time zone is a time zone in which the purchaser wanting to receive application for the discount when making the settlement of the time-limited special offer article should put the commercial article into the shopping basket. The time zone is a discount applying condition if the advertisement commercial article is the time-limited special offer article. The items of information embedded in the commercial article button 81a is transmit to the shop server 20 when clicking (touching) the commercial article button 81a. Further, the end button 81b is a button for ending the display on the advertisement screen 81. The end button 81b is embedded with information indicating an instruction of ending the display on the advertisement screen 81.

Moreover, as illustrated in FIG. 3, the shop server device 20 stores a purchase desire advertisement commercial article management table 66 in the storage unit 20c. The purchase desire advertisement commercial article management table 66 is a table to manage the advertisement commercial article of which a purchase desire is indicated by clicking the commercial article button 81a on the advertisement screen 81. Note that the shop server device 20 is stored with the purchase desire advertisement commercial article management tables 66 with respect to all of the shopping baskets prepared in the shop. Further, a corresponding shopping basket ID is allocated to each purchase desire advertisement commercial article management table 66.

FIG. 8 is a diagram illustrating the purchase desire advertisement commercial article management table 66.

As illustrated in FIG. 8, each of records of the purchase desire advertisement commercial article management table 66 includes fields such as the "commercial article ID", a "purchase count", an "amount of discount", a "put-in completion flag", the "advertisement category flag" and the "time zone". The "commercial article ID" field is a field to record the commercial article ID of the advertisement commercial article. The "purchase count" field is a field recorded with a desired purchase count of the advertisement commercial articles. The "amount of discount" field is a field recorded with an amount of discount per piece of the advertisement commercial article. The "put-in completion flag" field is a field recorded with a put-in flag indicating whether the input of the advertisement commercial article into the shopping basket is completed or not. The "advertisement category flag" field is a field recorded with an advertisement category flag ("1" or "0") of the advertisement commercial article. The "time zone" field is a field recorded with a time zone in which the time-limited special offer of the advertisement commercial article is received when the advertisement category flag of the advertisement commercial article is "1". Note that when the advertisement category flag of the advertisement commercial article is "0", the advertisement commercial article is excluded from the time-limited special offer article, and hence the "time zone" field is blanked.

Moreover, as shown in FIG. 3, the shop server device 20 stores coupon screen data 67 in the storage unit 20c. The coupon screen data 67 is screen data for displaying a coupon screen presented to the purchaser carrying the shopping basket. The coupon screen contains, in the same way as the advertisement screen 81 (see FIG. 7) does, one or more commercial article buttons and the end button. The coupon screen may contain two types of commercial article buttons. A purport that the associated commercial article is a specified purchase count discount commercial article discounted by purchasing more of the commercial articles than a predetermined specified purchase count is described in the first type of commercial article button. The commercial article ID, the specified count, the amount of discount per piece and a coupon category flag of the specified purchase count discount commercial article are embedded in the commercial article button. A purport that the associated commercial article is a reserved discount commercial article discounted by reserving the purchase is described in the second type of the commercial article button. The commercial article ID, a discount rate and the coupon category flag of the reserved discount commercial article are embedded in the commercial article button. Note that the coupon category flag is information for defining whether the coupon commercial article is the specified purchase count discount commercial article or the reserved discount commercial article. In the embodiment, when the coupon category flag is "1", a definition is that the coupon commercial article is the specified purchase count discount commercial article. The information embedded in the commercial article button is transmitted to the shop server device 20 when clicking (touching) the commercial article button. Moreover, the end button is a button for ending the display on the coupon screen.

Further, as illustrated in FIG. 3, the shop server device 20 stores a specified purchase count discount commercial article management table 68 in the storage unit 20c. The specified purchase count discount commercial article management table 68 is a table to manage the coupon commercial article scheduled to be purchased by clicking (touching) the commercial article button on the coupon screen. Incidentally, the shop server device 20 is stored with the specified purchase count discount commercial article management tables 68 with respect to all of the shopping baskets prepared in the shop. Furthermore, one shopping basket ID is allocated to each specified purchase count discount commercial article management table 68.

FIG. 9 is a diagram illustrating the specified purchase count discount commercial article management table 68.

As illustrated in FIG. 9, each of records of the specified purchase count discount commercial article management table 68 contains fields such as the "commercial article ID", a "specified count", the "amount of discount" and a "put-in count reaching flag". The "commercial article ID" is a field recorded with the commercial article ID of the coupon commercial article. The "specified count" field is a field recorded with a specified count defined as a condition under which the discount application of the coupon commercial article is accepted. The "amount of discount" field is a field recorded with an amount of discount per piece of the coupon commercial article. The "put-in count reaching flag" is a field recorded with an put-in count reaching flag indicating whether a predetermined count or more of coupon commercial articles are put into the shopping basket or not. In the embodiment, the put-in count reaching flag having a state "1" indicates that the specified count or more of coupon commercial articles are inputted into the shopping basket.

Moreover, as illustrated in FIG. 3, the shop server device 20 stores a purchase reserved commercial article management table 69 in the storage unit 20c. The purchase reserved commercial article management table 69 is a table to manage the coupon commercial article reserved for the purchase through the unillustrated coupon screen. Note that the shop server device 20 retains the purchase reserved commercial article management tables 69 with respect to each of the shopping baskets prepared in the shop. Moreover, a corresponding shopping basket ID is allocated to each purchase reserved commercial article management table 69.

FIG. 10 is a diagram schematically showing the purchase reserved commercial article management table 69.

As illustrated in FIG. 10, each of records of the purchase reserved commercial article management table 69 contains fields such as the "commercial article ID", the "number of pieces", a "secret code number" and the "discount rate". The "commercial article ID" field is a field recorded with the commercial article ID of the coupon commercial article. The "number of pieces" field is a field recorded with the number of pieces reserved for the purchase of the coupon commercial articles. The "secret code number" field is a field recorded with a secret code number used in an authentication procedure imposed on the purchaser coming to take the coupon commercial article. The "discount rate" field is a field recorded with a discount rate used for calculating an amount of discount subtracted from the subtotal of the commercial articles when making the settlement of the coupon commercial articles.

Further, as illustrated in FIG. 3, the shop server device 20 includes the storage unit 20c storing an advertisement program 71, an advertisement commercial article registration program 72, a coupon distribution program 73, a coupon commercial article registration program 74, a shopping basket management program 75, a settlement program 76 and a print program 77.

The advertisement program 71 is a program to transmit the advertisement screen data 65 in FIG. 3 to each of the shopping basket devices 50 in the shop. Details of an advertising process executed by the CPU 20d according to the advertisement program 71 will be described later on with reference to FIG. 12.

The advertisement commercial article registration program 72 is a program for registering, in the purchase desire advertisement commercial article management table 66, the information transmitted from the shopping basket device 50 when clicking (touching) the commercial article button 81a on the advertisement screen 81 in any one of the shopping basket devices 50. Details of a process executed by the CPU 20d according to the advertisement commercial article registration program 72 will be described later on with reference to FIG. 13.

The coupon distribution program 73 is a program to transmit the coupon screen data 67 in FIG. 3 to each of the shopping basket devices in the shop. Details of a coupon distribution process executed by the CPU 20d according to the coupon distribution program 73 will be described later on with reference to FIG. 14.

A coupon commercial article registration program 74 is a program to register, when clicking (touching) the commercial article button on the unillustrated coupon screen in any one of the shopping basket devices, the information transmitted from the shopping basket device 50 in the specified purchase count discount commercial article management table 68 in FIG. 9 or in the purchase reserved commercial article management table 69 in FIG. 10. Details of a process executed by the CPU 20d according to the coupon commercial article registration program 74 will be described later on with reference to FIG. 15.

The shopping basket management program 75 is a program to generate, when the tag ID of the electronic tag 40 of the commercial article put into any one of the shopping baskets is transmitted from the shopping basket device 50, the screen data based on this tag ID and transmitting the screen data to the shopping basket device 50. Details of a process executed by the CPU 20d according to the shopping basket management program 75 will be described later on with reference to FIGS. 17 through 21.

The settlement program 76 is a program to generate and to transmit the screen data to the shopping basket device 50 entering the counter area. The settlement program is also the program to accept a settlement procedure from the purchaser and to execute the settlement process. Details of a process executed by the CPU 20d according to the settlement program 76 will be described later on with reference to FIGS. 23 through 29.

The print program 77 is a program to generate and to transmit print data to the printing device 30.

<<Process>>
<Screen Display>

In the shopping basket device 50, when a main power source of the shopping basket device is turned on, the CPU 50g reads the screen display program 51 from the flash memory unit 50f and starts the screen display process.

Figure 11:
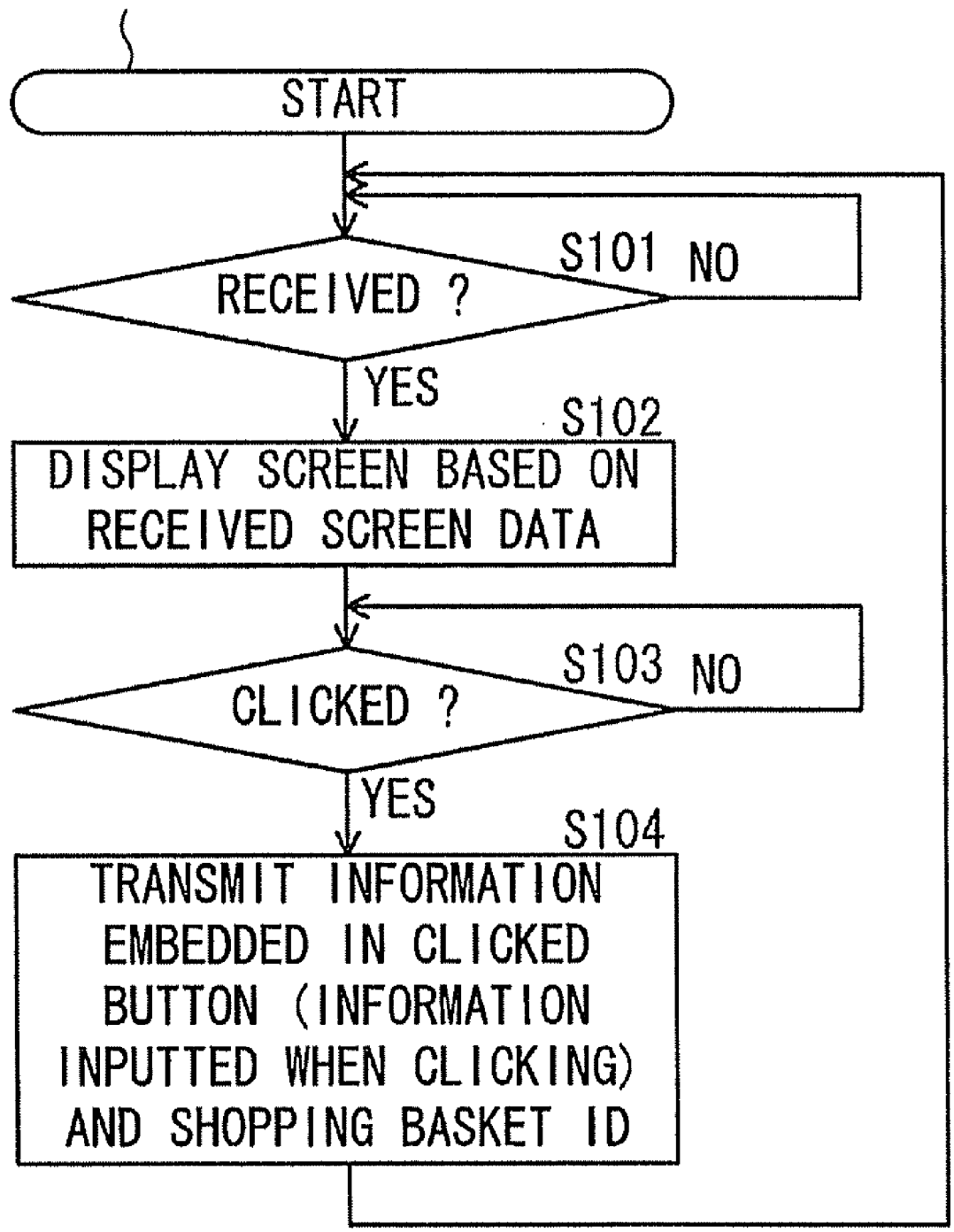
FIG. 11 is a flowchart illustrating a flow of a screen display process in the embodiment.

FIG. 11 is a flowchart showing a flow of the screen display process.

After starting the screen display process, in first step S101, the CPU 50g stands by till screen data is transmitted to the wireless LAN unit 50e from the shop server device 20 via the network N1 and the access point device 10. Then, when the screen data is received from the shop server device 20, the CPU 50g advances the process to step S102.

In step S102, the CPU 50g displays a screen on the display unit 50a based on the screen data received in step S101.

In next step S103, the CPU 50g stands by till any one of buttons on the screen displayed on the display unit 50a in step S102 is clicked (touched). Then, when any one of the buttons is clicked, the CPU 50g advances the process to step S104.

In step S104, the CPU 50g transmits information embedded in the clicked (touched) button, information has been inputted into an input box such as a text box when the button is clicked (touched), and the shopping basket ID to the shop server device 20 via the wireless LAN unit 50e, the access point device 10 and the network N1. Thereafter, the CPU 50g loops back the process to step S101, and comes to a status of standing by till the screen data is received from the shop server device 20.

<Advertisement>

In the shop server device 20, when main power source of the shop server device 20 is turned on, the CPU 20d reads the advertisement program 71 from the storage unit 20c and starts the advertisement process.

Figure 12:
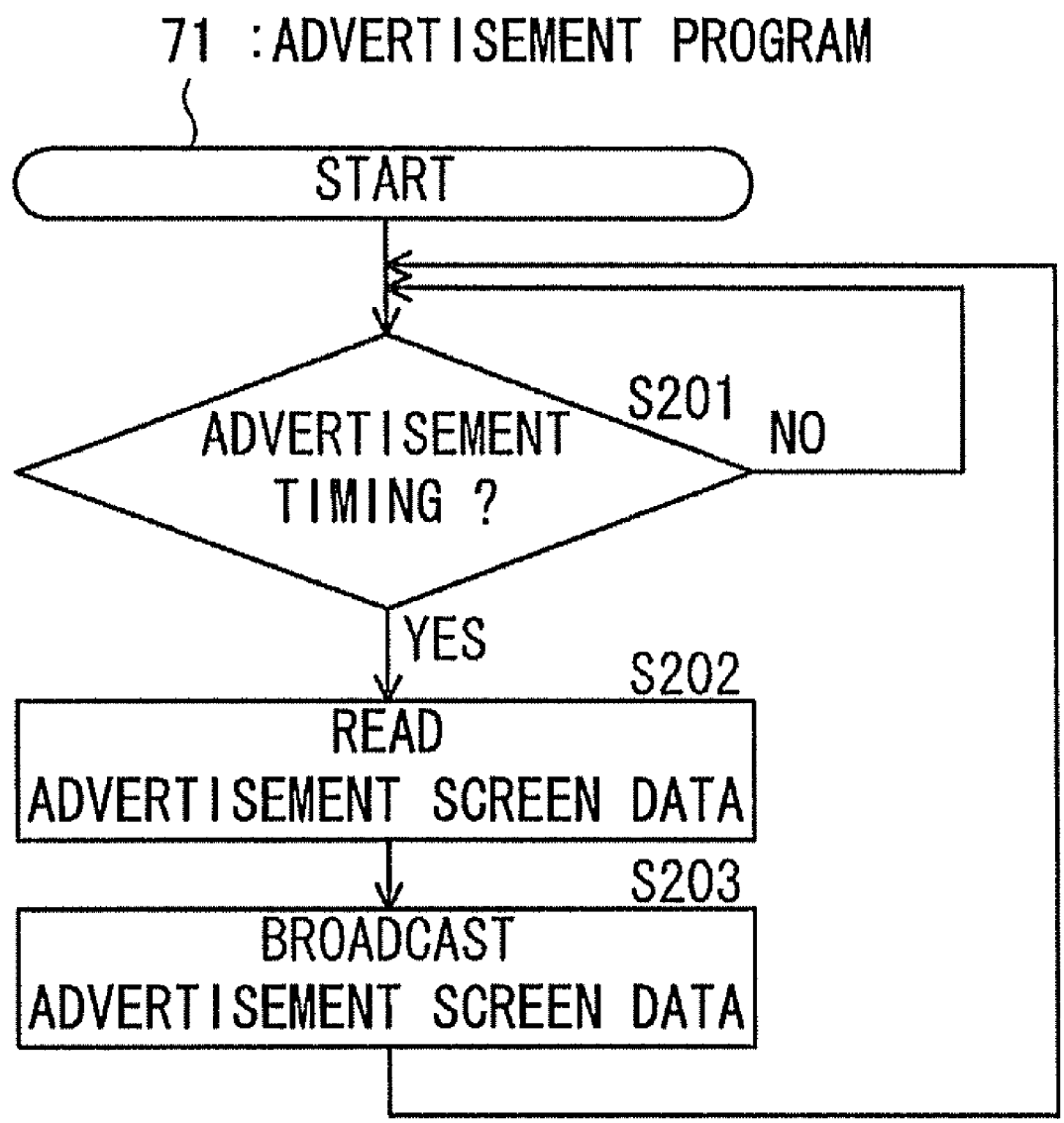
FIG. 12 is a flowchart illustrating a flow of an advertisement process in the embodiment.

FIG. 12 is a flowchart illustrating a flow of the advertisement process in the embodiment.

After starting the advertisement process, in first step S201, the CPU 20d stands by till a predetermined date/time (advertisement timing) comes. Then, when the predetermined date/time (advertisement timing) comes, the CPU 20d advances the process to step S202.

In step S202, the CPU 20d reads the advertisement screen data 65 from the storage unit 20c.

In next step S203, the CPU 20d broadcasts the advertisement screen data 65 read in step S202 to all of the shopping basket devices 50 via the network N1 and the access point device 10. Thereafter, the CPU 20d loops back the process to step S201, and comes to a status of standing by till it reaches the predetermined date/time (advertisement timing).

Note that the shopping basket device 50, upon receiving the advertisement screen data 65 broadcasted from the shop server device 20 in step S203, displays the advertisement screen 81 (see FIG. 7) on the display unit 50a (steps S101, S102). Thereafter, when the purchaser clicks (touches) the commercial article button 81a or the end button 81b on the advertisement screen 81, the shopping basket device 50 transmits the information embedded in the clicked (touched) button together with the shopping basket ID to the shop server device 20 (steps S103, S104).

<Registration of Advertisement Commercial Article>

The shop server device 20 receives information transmitted from the shopping basket device 50 by clicking (touching) the commercial article button 81a or the end button 81b on the advertisement screen 81. the reception is a trigger of starting operation of the CPU 20d. The CPU 20d reads the advertisement commercial article registration program 72 from the storage unit 20c to start an advertisement commercial article registration process. Note that the CPU 20d, in a case of receiving the information from the plurality of shopping basket devices 50, executes the advertisement commercial article registration processes in parallel with respect to the individual shopping basket devices 50.

Figure 13:
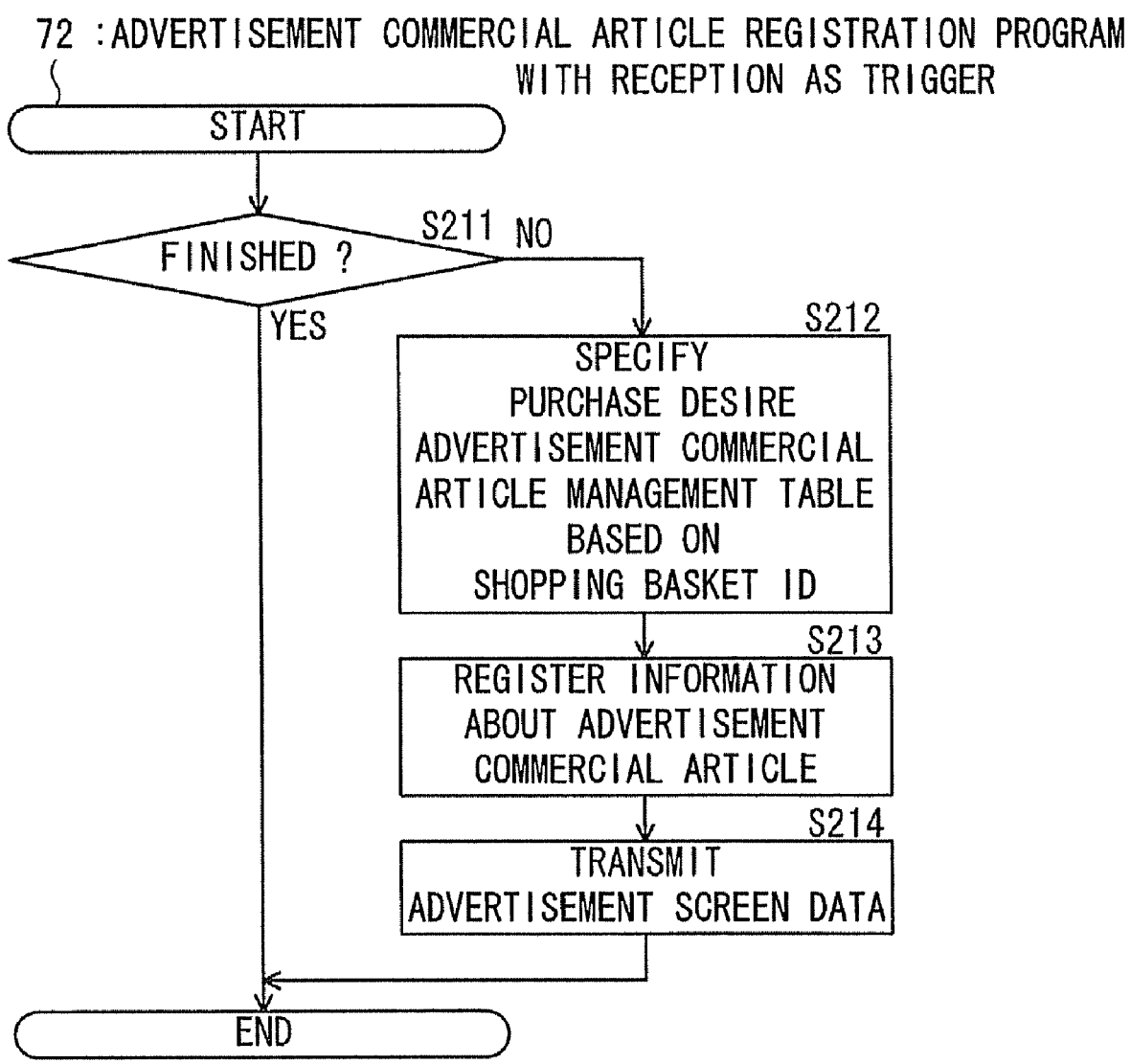
FIG. 13 is a flowchart illustrating a flow of an advertisement commercial article registration process in the embodiment.

FIG. 13 is a flowchart illustrating a flow of the advertisement commercial article registration process in the embodiment.

After starting the advertisement commercial article registration process, in first step S211, the CPU 20d determines whether the clicked button is the end button 81b or not. Then, if the clicked button is the end button 81b, the CPU 20d finishes the advertisement commercial article registration process in FIG. 13. On the other hand, if the clicked button is not the end button 81b (i.e., if the clicked button is one of the commercial article buttons 81a), the CPU 20d divaricates the process to step S212 from step S211.

In step S212, the CPU 20d specifies the purchase desire advertisement commercial article management table 66 (see FIG. 8) corresponding to the received shopping basket ID.

In next step S213, the CPU 20d registers the received information in the purchase desire advertisement commercial article management table 66 specified in step S212. The received information is the information about the bargain article or the time-limited special offer article. The received information contains the commercial article ID, the advertisement category flag, and the amount of discount per piece. The received information further contains the time zone if the advertisement category flag is "1". If a record including the same commercial article ID within the received information exists in the purchase desire advertisement commercial article management table 66, the CPU 20d adds a value "1" to a value given in the "number of pieces" field. Further, On the other hand, if a record including the same commercial article ID within the received information does not exist in the purchase desire advertisement commercial article management table 66, the CPU 20d adds a record containing the received information to the purchase desire advertisement commercial article table. Then, a value "1" is set in the "number of pieces" field of the record containing the received information. In this way, after registering the received information regarding the advertisement commercial article, the CPU 20d advances the process to step S214.

In step S214, the CPU 20d transmits the advertisement screen data 65 to the shopping basket device 50 associated with the received shopping basket ID. Thereafter, the CPU 20d finishes the advertisement commercial article registration process in FIG. 13.

<Coupon Distribution>

When a main power source of the shop server device 20 is turned on, the CPU 20d reads the coupon distribution program 73 from the storage unit 20c and starts the coupon distribution process.

Figure 14:
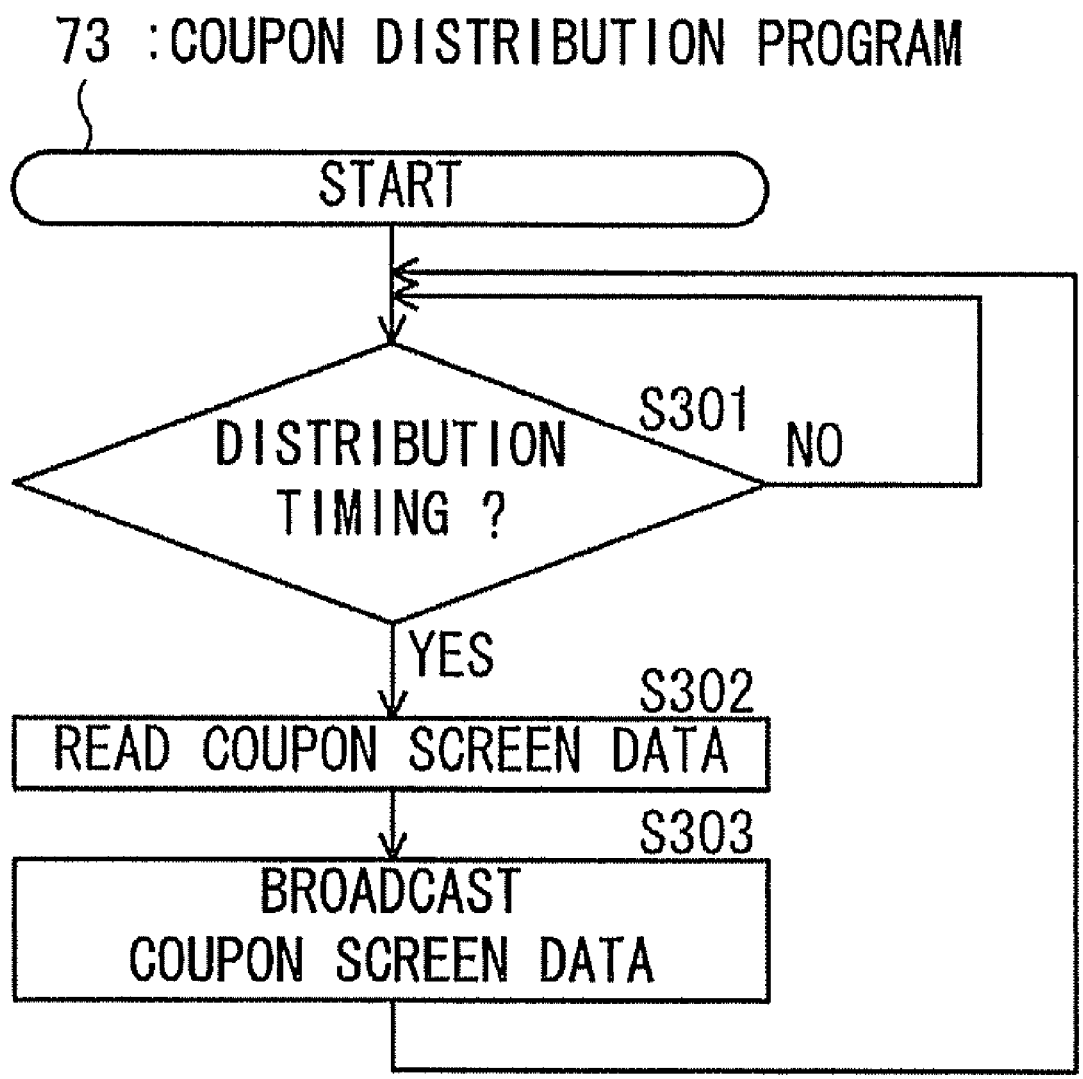
FIG. 14 is a flowchart illustrating a flow of a coupon distribution process in the embodiment.

FIG. 14 is a flowchart illustrating a flow of the coupon distribution process.

After starting the coupon distribution process, in first step S301, the CPU 20d stands by till a predetermined date/time (distribution timing) comes. When the predetermined date/time (distribution timing) comes, the CPU 20d advances the process to step S302.

In step S302, the CPU 20d reads the coupon screen data 67 from the storage unit 20c.

In next step S303, the CPU 20d broadcasts the coupon screen data 67 read in step S302 to all of the shopping basket devices 50 via the network N1 and the access point device 10. Thereafter, the CPU 20d loops back the process to step S301 and comes to a status of standing by till the predetermined date/time (distribution timing) comes.

Note that the shopping basket device 50, when receiving the coupon screen data 67 broadcasted from the shop server device 20 in step S303, displays the unillustrated coupon screen on the display unit 50a (steps S101, S102). Thereafter, when the purchaser clicks (touches) the commercial article button or the end button on the coupon screen, the shopping basket device 50 transmits information embedded in the clicked (touched) button together with the shopping basket ID to the shop server device 20 (steps S103, S104).

<Registration of Coupon Commercial Article>

The shop server device 20 receives information transmitted from the shopping basket device 50 by clicking the commercial article button or the end button on the coupon screen. The reception is a trigger of an operation of the CPU 20d. Then, the CPU 20d reads the coupon commercial article registration program 74 from the storage unit 20c, and starts a coupon commercial article registration process. Note that the CPU 20d, in the case of receiving the information from the plurality of shopping basket devices 50, executes the coupon commercial article registration processes in parallel with respect to the individual shopping basket devices 50.

Figure 15:
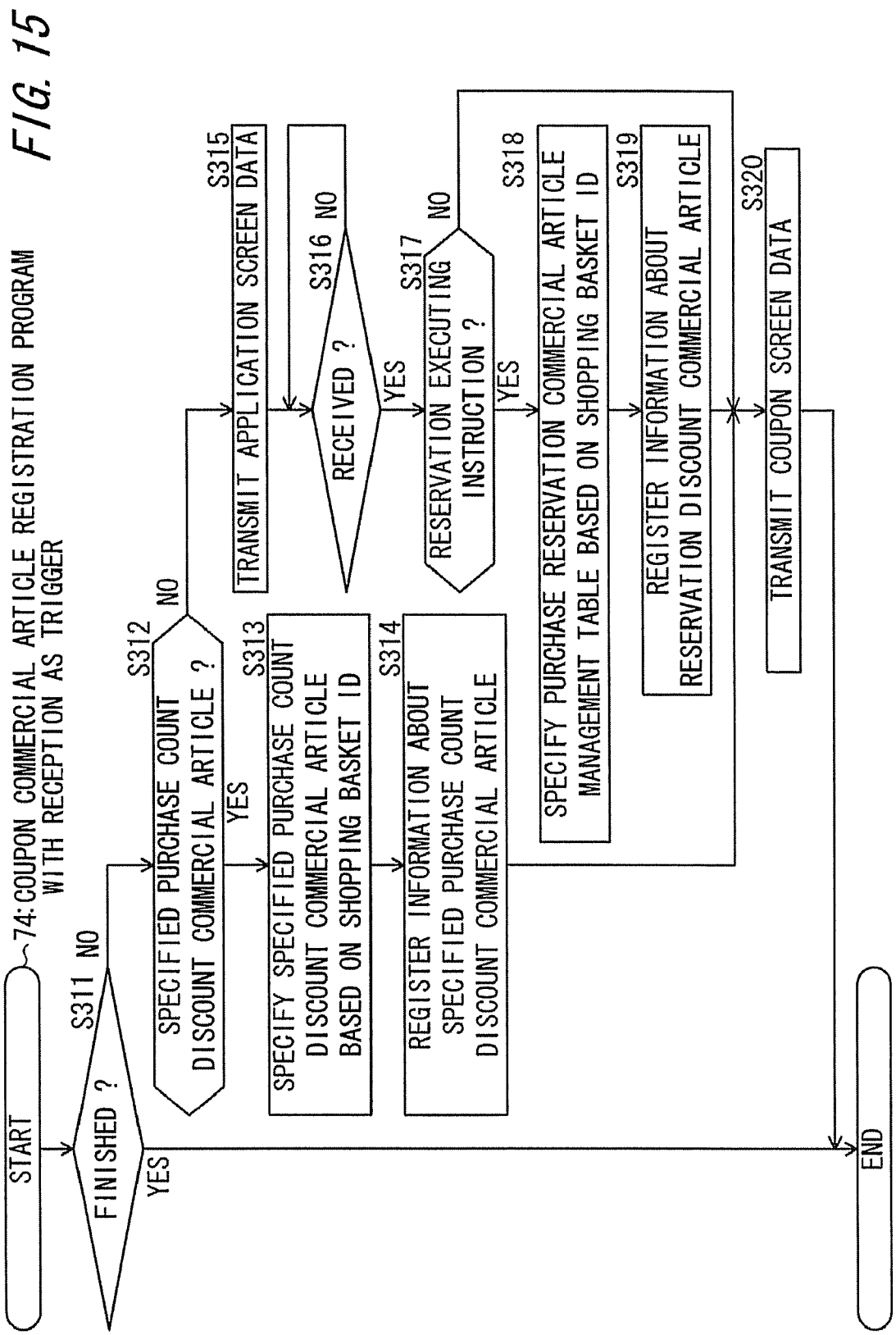
FIG. 15 is a flowchart illustrating a flow of a coupon commercial article registration process in the embodiment.

FIG. 15 is a flowchart illustrating a flow of the coupon commercial article registration process in the embodiment.

After starting the coupon commercial article registration process, in first step S311, the CPU 20d determines whether the clicked button is the end button or not. Then, if the clicked button is the end button 81b, the CPU 20d finishes the coupon commercial article registration process in FIG. 15. On the other hand, if the clicked button is not the end button (i.e., if the clicked button is one of the commercial article buttons), the CPU 20d advances the process to step S312 from step S311.

In step S312, the CPU 20d determines whether the coupon category flag contained in the received information is "1" or "0". Namely, the CPU 20d determines whether the coupon commercial article selected by clicking the commercial article button on the coupon screen is the specified purchase count discount commercial article or the reserved discount commercial article. Then, if the selected coupon commercial article is the specified purchase count discount commercial article (if the coupon category flag is "1"), the CPU 20d advances the process to step S313 from step S312.

In step S313, the CPU 20d specifies the specified purchase count discount commercial article management table 68 (see FIG. 9) corresponding to the received shopping basket ID.

In next step S314, the CPU 20d registers the received information in the specified purchase count discount commercial article management table 68 which has been thus specified at step S313. The received information contains the commercial article ID, a specified count and the amount of discount per piece. The CPU 20d adds a record containing the commercial article ID, the specified count and the amount of discount per piece to the specified purchase count discount commercial article management table 68. In the record added herein, a put-in count reaching flag set in a value of "0" is stored as an initial value in a "put-in count reaching flag" field. After thus registering the received information regarding the specified purchase count discount commercial article, the CPU 20d advances the process to step S320.

On the other hand, in step S312, if the coupon commercial article selected by clicking the commercial article button on the coupon screen is the reserved discount commercial article (if a value of the coupon category flag is "0"), the CPU 20d divaricates the process to step S315 from step S312.

In step S315, the CPU 20d transmits application screen data for displaying an unillustrated application screen to the shopping basket device 50 being a transmission origin via the network N1 and the access point device 10. In the embodiment, the unillustrated application screen includes a description of a content of a query with respect to whether the purchase will be really reserved or not. The unillustrated application screen also contains an input box such as a text box for inputting a secret code number, ten keys, a reservation executing button and a cancel button. Note that the shopping basket device 50, upon receiving the application screen data, displays the application screen on the display unit 50a. When the purchaser inputs the secret code number to the input box by touching the ten keys on the application screen and clicks (touches) the reservation execution button, the shopping basket device 50 transmits information indicating executing the reservation, the secret code number and the shopping basket ID (steps S101 to S104).

In next step S316, the CPU 20d waits a reception of information from the shopping basket device 50 that has transmitted the unillustrated application screen data. Then, when receiving the information from the shopping basket device 50, the CPU 20d advances the process to step S317.

In step S317, the CPU 20d determines whether or not the received information contains the information indicating executing the reservation. Then, if the received information contains no information indicating executing the reservation (if the received information contains information indicating cancellation), the CPU 20d divaricates the process to step S320 from step S317. On the other hand, if the received information contains the information indicating executing the reservation, the CPU 20d advances the process to step S318 from step S317.

In step S318, the CPU 20d specifies the purchase reserved commercial article management table 69 (see FIG. 10) corresponding to the received shopping basket ID.

In next step S319, the CPU 20d registers the information received in step S316 and information received before step S316 in the purchase reserved commercial article management table 69 specified in step S318. The received information contains the commercial article ID, the secret code number and the discount rate. If a record having the same commercial article ID among the received information exists in the purchase reserved commercial article management table 69, The CPU 20d adds a value "1" to a value given in the "number of pieces" field of this record. If a record having the same commercial article ID among the received information does not exists in the purchase reserved commercial article management table 69, the CPU 20d sets a value "1" in the value given in the "number of pieces" field of the record containing the received information, thus adding the data to the purchase reserved commercial article management table 69. In this way, after registering the received information regarding the reserved discount commercial article, the CPU 20d advances the process to step S320.

In step S320, the CPU 20d transmits the coupon screen data 67 to the shopping basket device 50. Thereafter, the CPU 20d terminates the coupon commercial article registration process in FIG. 15.

<Detection of Inputted Commercial Article>

A main power source of the shopping basket device 50 is turned on, the CPU 50g reads a put-in commercial article detection program 52 from the flash memory unit 50f, and starts the put-in commercial article detection process.

Figure 16:
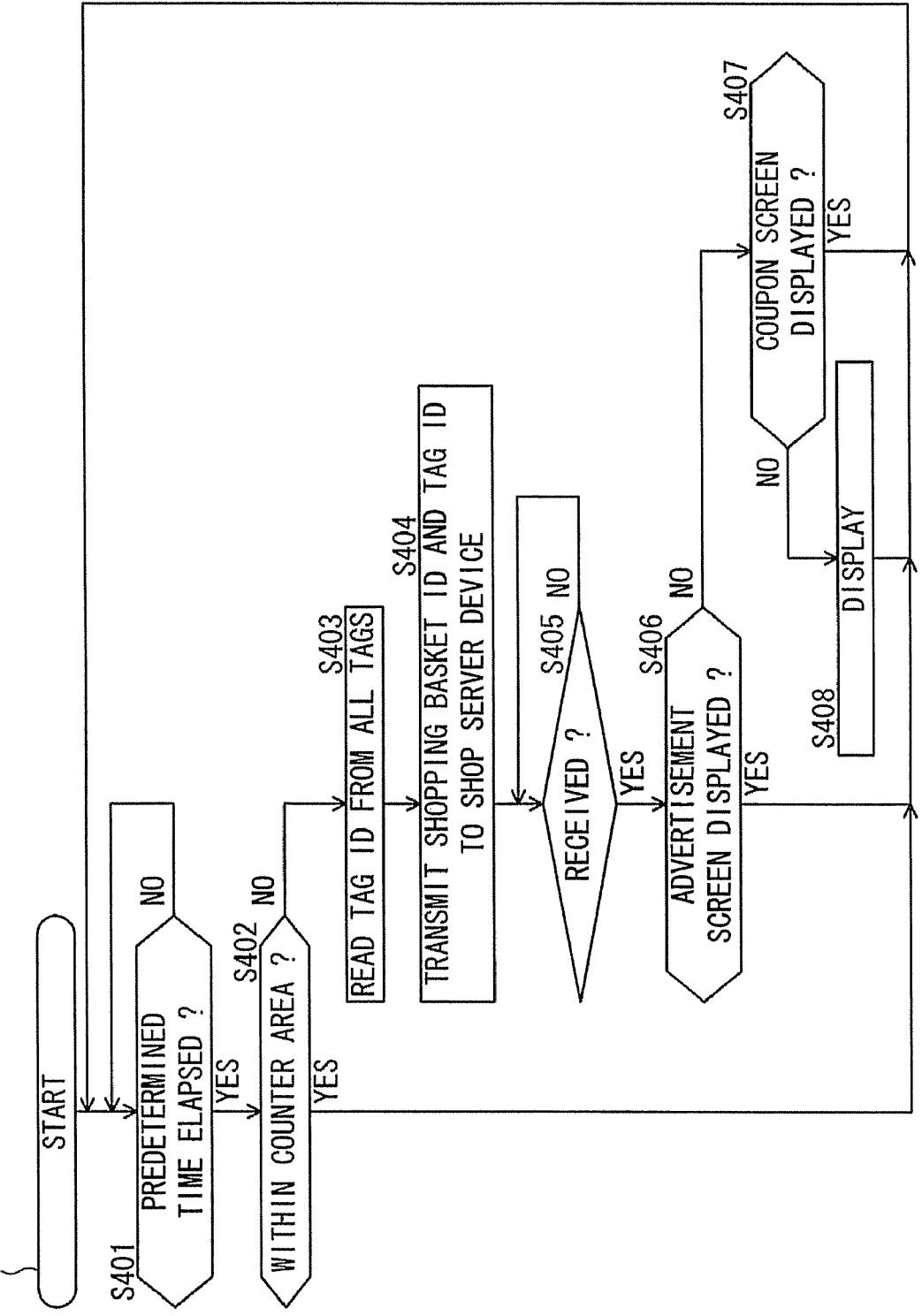
FIG. 16 is a flowchart illustrating a flow of a put-in commercial article detection process in the embodiment.

FIG. 16 is a flowchart illustrating a flow of the put-in commercial article detection process in the embodiment.

After starting the put-in commercial article detection process, in first step S401, the CPU 50g stands by till a predetermined period of time (e.g., 1 minute) elapses. When the predetermined period of time elapses, the CPU 50g advances the process to step S402.

In step S402, the CPU 50g determines whether or not the shopping basket device 50 exists in the counter area. The determination about whether or not the shopping basket device 50 exists in the counter area is made based on whether or not the wireless LAN unit 50e establishes the wireless connection with the access point device 10 in the counter area. Then, if the self-machine exists in the counter area, the CPU 50g loops back the process to step S401. On the other hand, if the shopping basket device 50 does not exist in the counter area, the CPU 50g advances the process to step S403.

In step S403, the CPU 50g reads the tag IDs from the electronic tags 40 of all of the commercial articles put into the shopping basket via the tag reader unit 50c.

Note that the CPU 50g executing step S403 functions as the acquiring unit described above.

In next step S404, the CPU 50g transmits the tag IDs and the shopping basket IDs, which are read in step S403, to the shop server device 20 via the wireless LAN unit 50e, the access point device 10 and the network N1.

It is noted that the CPU 50g executing step S404 functions as the first transmitting unit described above.

In next step S405, the CPU 50g stands by till the screen data is received at the wireless LAN unit 50e from the shop server device 20 via the network N1 and the access point device 10. Then, when receiving the screen data from the shop server device 20, the CPU 50g advances the process to step S406.

In step S406, the CPU 50g determines whether or not the advertisement screen 81 is displayed on the display unit 50a. Then, if the advertisement screen 81 is displayed on the display unit 50a, the CPU 50g loops back the process to step S401, and returns to the status of standing by till the predetermined period of time elapses. On the other hand, if the advertisement screen 81 is not displayed on the display unit 50a, the CPU 50g advances the process to step S407 from step S406.

In step S407, the CPU 50g determines whether or not the unillustrated coupon screen has been displayed on the display unit 50a. Then, if the unillustrated coupon screen has been displayed on the display unit 50a, the CPU 50g loops back the process to step S401 and returns to the status of standing by till the predetermined period of time elapses. On the other hand, if the unillustrated coupon screen has not been displayed on the display unit 50a, the CPU 50g advances the process to step S408 from step S407.

In step S408, the CPU 50g displays a screen based on the screen data received from the shop server device 20 in step S404, on the display unit 50a. Thereafter, the CPU 50g loops back the process to step S401 and returns to the status of standing by till the predetermined period of time elapses.

Note that the CPU 50g executing steps S405-S408 functions as the display unit described above.

<Management of Shopping Basket>

The shop server device 20, as a trigger, receives the tag ID and the shopping basket ID transmitted from the shopping basket device 50. The CPU 20d reads the shopping basket management program 75 from the storage unit 20c, and starts a shopping basket management process. Note that in a case where the tag IDs are sent from the plurality of shopping basket devices 50, the CPU 20d executes the shopping basket management processes in parallel with respect to the individual shopping basket devices 50.

Figure 17:
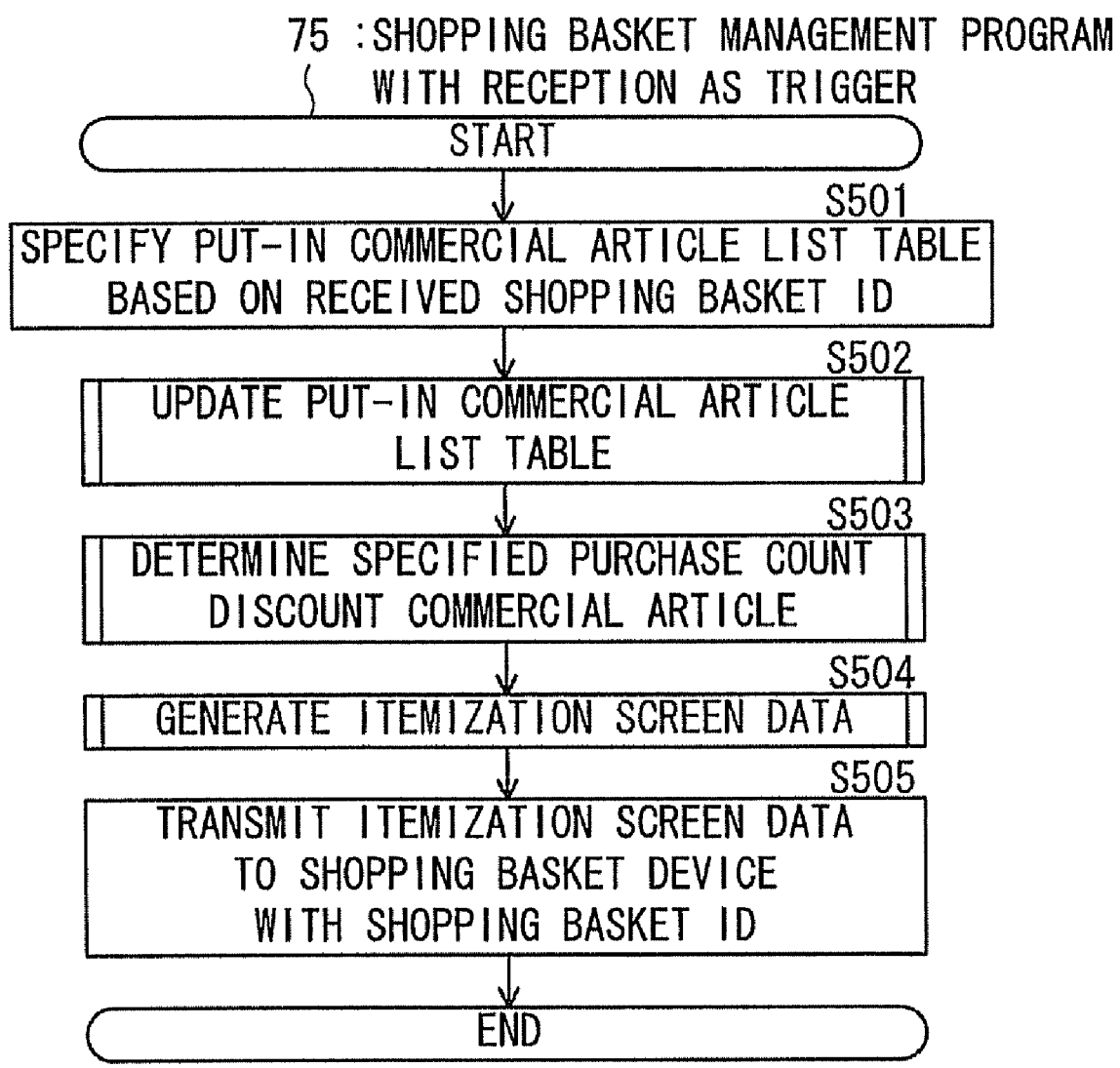
FIG. 17 is a flowchart illustrating a flow of a shopping basket management process in the embodiment.

FIG. 17 is a flowchart illustrating a flow of the shopping basket management process in the embodiment.

After starting the shopping basket management process, in first step S501, the CPU 20d specifies the input commercial article list table 64 corresponding to the received shopping basket ID.

In next step S502, the CPU 20d executes a put-in commercial article list table update subroutine.

Figure 18:
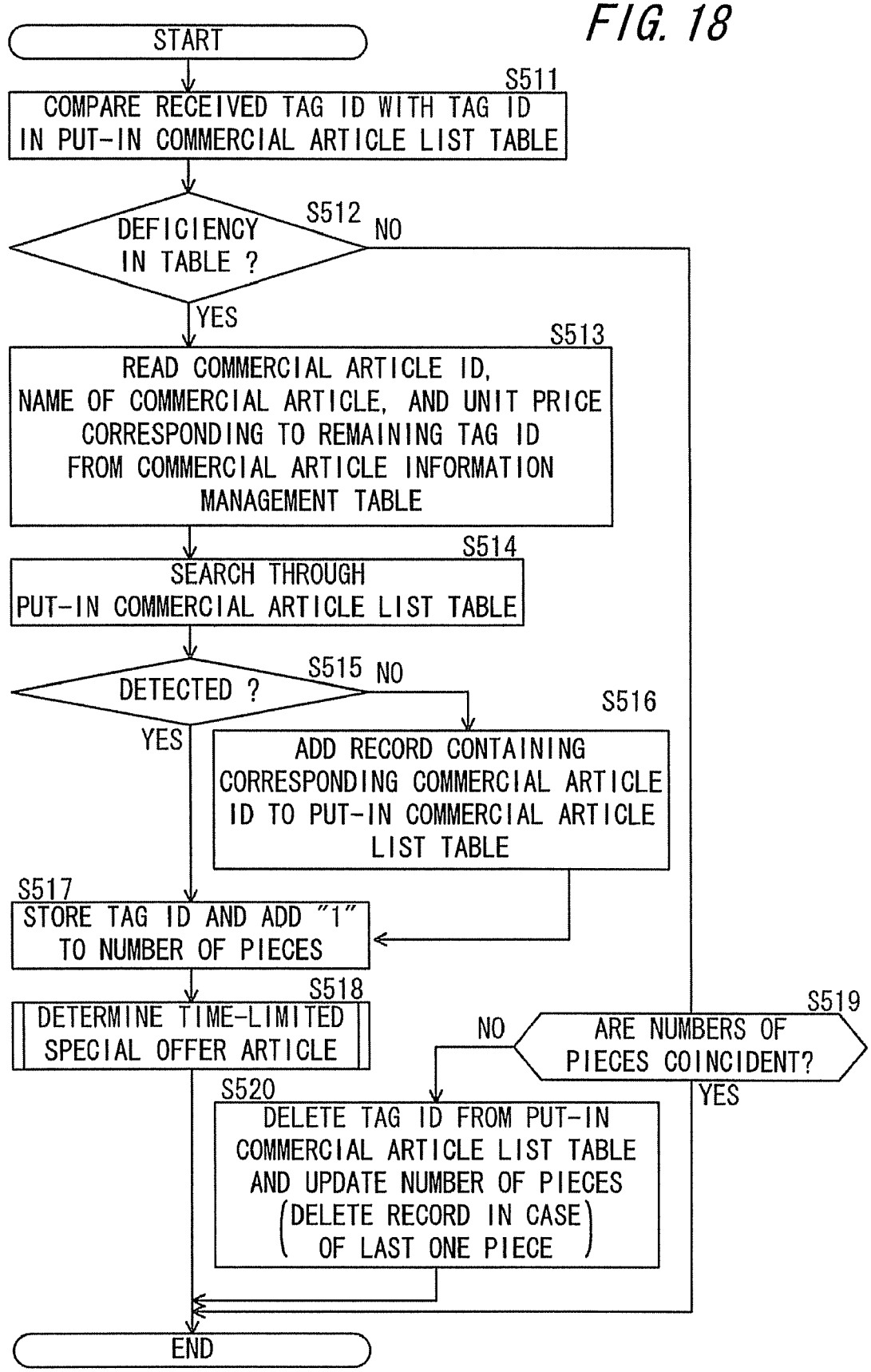
FIG. 18 is a flowchart illustrating a flow of the inputted commercial article list table update subroutine in the embodiment.

FIG. 18 is a flowchart illustrating a flow of the inputted commercial article list table update subroutine in the embodiment.

After starting the put-in commercial article list table update subroutine, in first step S511, the CPU 20d compares all of the tag IDs received from the shopping basket device 50 with all of the tag IDs registered in the input commercial article list table 64 of this shopping basket device 50.

In next step S512, the CPU 20d determines whether or not a remaining tag ID, which is not coincident with any one of the tag IDs registered in the input commercial article list table 64, exists in all of the tag IDs received from the shopping basket device 50. Then, if the remaining tag ID, which is not coincident with any one of the tag IDs registered in the put-in commercial article list table 64, exists in all of the tag IDs received from the shopping basket device 50, the CPU 20d advances the process to step S513.

In step S513, the CPU 20d reads the commercial article, the name of commercial article and the unit price, which are corresponding to the remaining tag ID, from the commercial article information management table 63 (see FIG. 5).

In next step S514, the CPU 20d searches through the input commercial article list table 64 specified in step S501 in FIG. 17 in a way that uses the commercial article ID read in step S513 as a search condition.

In next step S515, the CPU 20d determines whether or not a record is detected from the input commercial article list table 64 as a result of the search in step S514. Then, if the record is detected from the put-in commercial article list table 64, the CPU 20d advances the process to step S517. On the other hand, if the record is not detected from the put-in commercial article list table 64, the CPU 20d advances the process to step S516 from step S515.

In step S516, the CPU 20d adds the record containing the commercial article ID, the name of commercial article and the unit price read in step S513 to the put-in commercial article list table 64 of the shopping basket device 50. Herein, the "tag ID" field of the record added to the input commercial article list table 64 is blanked. Further, a value "0" is stored as the initial value in each of the "number of pieces" field and the "total amount of discount" field. Thereafter, the CPU 20d advances the process to step S517.

In step S517, the CPU 20d stores the remaining tag ID in the "tag ID" field of the record containing the commercial article ID read in step S513. Further, the CPU 20d adds a value "1" to the value in the "number of pieces" field of the record concerned.

In next step S518, the CPU 20d executes a time-limited special offer article determining subroutine.

Figure 19:
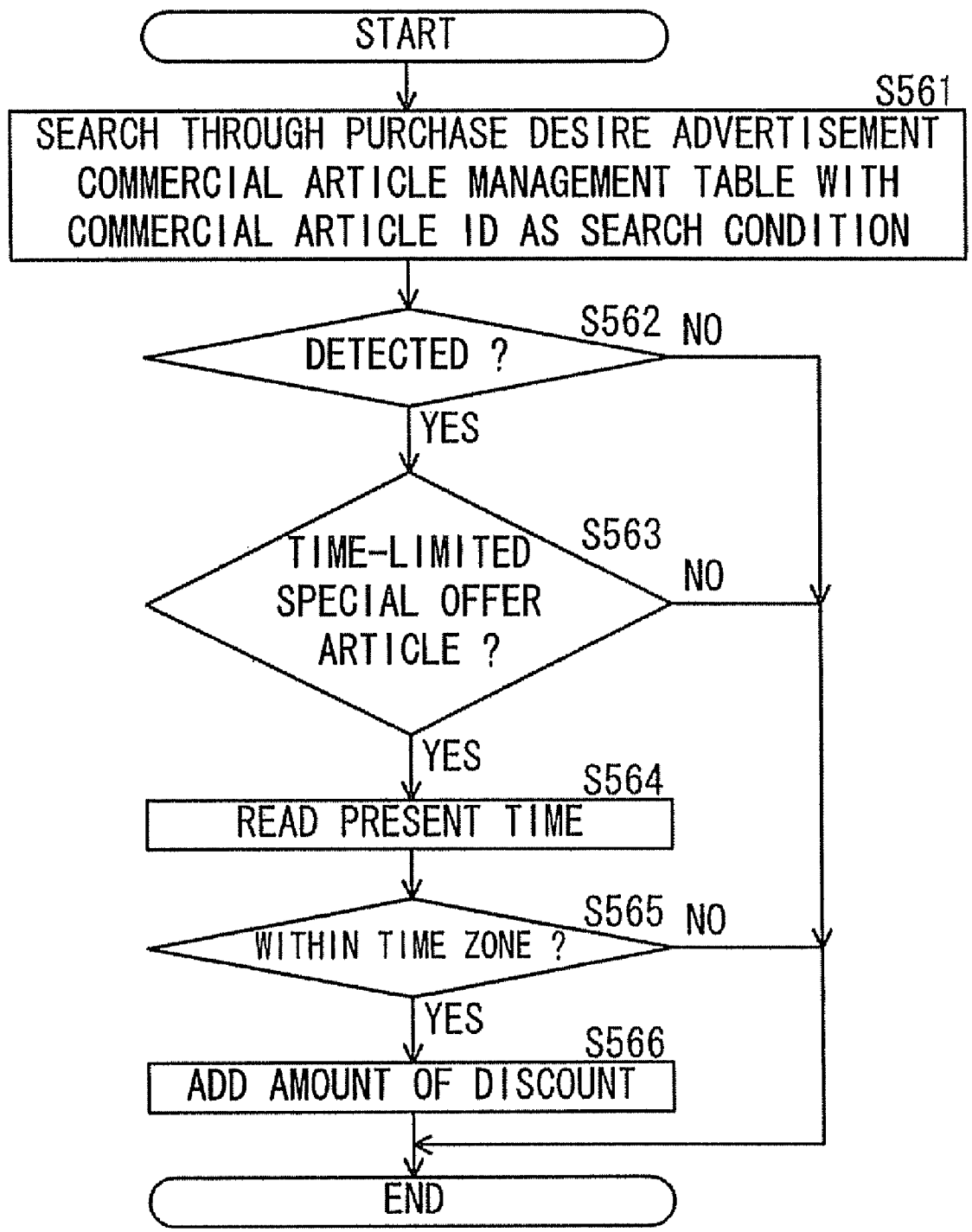
FIG. 19 is a flowchart illustrating a flow of the time-limited special offer article determining subroutine in the embodiment.

FIG. 19 is a flowchart illustrating a flow of the time-limited special offer article determining subroutine in the embodiment.

After starting the time-limited special offer article determining subroutine, in first step S561, the CPU 20d searches through the purchase desire advertisement commercial article management table 66 (see FIG. 8) in a way that uses the commercial article ID read in step S513 as a search condition.

In next step S562, the CPU 20d determines whether or not a record has been detected from the purchase desire advertisement commercial article management table 66 as a result of the search in step S561. Subsequently, if any record has not been detected from the purchase desire advertisement commercial article management table 66, the CPU 20*d* advances the process from step S562, then terminates the time-limited special offer article determining subroutine shown in FIG. 19 as well as terminating the put-in commercial article list table update subroutine in FIG. 18, and advances the process to step S503 in FIG. 17. On the other hand, if a record has been detected from the purchase desire advertisement commercial article management table 66, the CPU 20*d* advances the process to step S563.

In step S563, the CPU 20*d* determines, based on the advertisement category flag contained in the record detected by the search in step S561, whether or not the commercial article specified by the commercial article ID read in step S513 is the time-limited special offer article. Then, if the commercial article specified by the commercial article ID read in step S513 is not the time-limited special offer article, the CPU 20*d* advances the process from step S563, terminates the time-limited special offer article determining subroutine in FIG. 19 as well as terminating the put-in commercial article list table update subroutine in FIG. 18, and advances the process to step S503 in FIG. 17. On the other hand, if the commercial article specified by the commercial article ID read in step S513 is the time-limited special offer article, the CPU 20*d* advances the process to step S564.

In step S564, the CPU 20*d* reads the present time by acquiring the time information indicating the present time from the time information generating unit 20*b*.

In next step s565, the CPU 20*d* determines whether or not the time zone registered in the record detected by the search in step S561 contains the present time read in step S564. Then, if the time zone registered in the record detected by the search in step S561 contains none of the present time read in step S564, the CPU 20*d* advances the process from step S565, terminates the time-limited special offer article determining subroutine in FIG. 19 as well as terminating the inputted commercial article list table update subroutine in FIG. 18, and advances the process to step S503 in FIG. 17. On the other hand, if the time zone registered in the record detected by the search in step S561 contains the present time read in step S564, the CPU 20*d* advances the process to step S566.

In step S566, the CPU 20*d* adds the amount of discount registered in the record detected by the search in step S561 to a value given in the "total amount of discount" field of the record containing the commercial article ID in the input commercial article list table 64 specified in step S501 in FIG. 17. Thereafter, the CPU 20*d* terminates the time-limited special offer article determining subroutine in FIG. 19 as well as terminating the inputted commercial article list table update subroutine in FIG. 18, and advances the process to step S503 in FIG. 17.

On the other hand, in step S512 in FIG. 18, if the remaining tag ID, which is not coincident with any one of the tag IDs registered in the put-in commercial article list table 64, exists in all of the tag IDs received from the shopping basket device 50, the CPU 20*d* advances the process to step S519 from step S512.

In step S519, the CPU 20*d* determines whether or not the number of tag IDs received from the shopping basket device 50 is coincident with the number of tag IDs registered in the put-in commercial article list table 64. Subsequently, if the numbers of tag IDs are coincident with each other, the CPU 20*d* finishes the inputted commercial article list table update subroutine in FIG. 18, and advances the process to step S503 in FIG. 17. On the other hand, if the numbers of tag IDs are not coincident with each other, the CPU 20*d* advances the process to step S520 from step S519.

In step S520, the CPU 20*d* specifies the remaining tag ID, which is not coincident with any one of the tag IDs received from the shopping basket device 50, from all of the tag IDs registered in the put-in commercial article list table 64, and deletes the specified remaining tag ID from the put-in commercial article list table 64. Moreover, the CPU 20*d* subtracts a value "1" from the value given in the "number of pieces" of the record in which the specified remaining tag ID is stored in the "tag ID" field. As a result of the subtraction, when the value in the "number of pieces" field of the record comes to "0", the CPU 20*d* executes a process of deleting the record itself. Further, as a result of the subtraction, when the value in the "number of pieces" field is equal to or larger than "1", the CPU 20*d* further compares this value (the number of pieces) with the number of pieces in the record containing the same commercial article ID in the purchase desire advertisement commercial article management table 66 to which the same shopping basket ID is allocated. Then, if the number of pieces in the put-in commercial article list table 64 is smaller than the other value, the CPU 20*d* executes also a process of subtracting an amount obtained in a way that multiplies a deficient number of pieces by an amount of discount per piece from the total amount of discount given in the record of the put-in commercial article list table 64. Thereafter, the CPU 20*d* terminates the put-in commercial article list table update subroutine in FIG. 18, and advances the process to step S503 in FIG. 17.

In step S503, the CPU 20*d* executes a specified purchase count discount commercial article determining subroutine.

Figure 20:
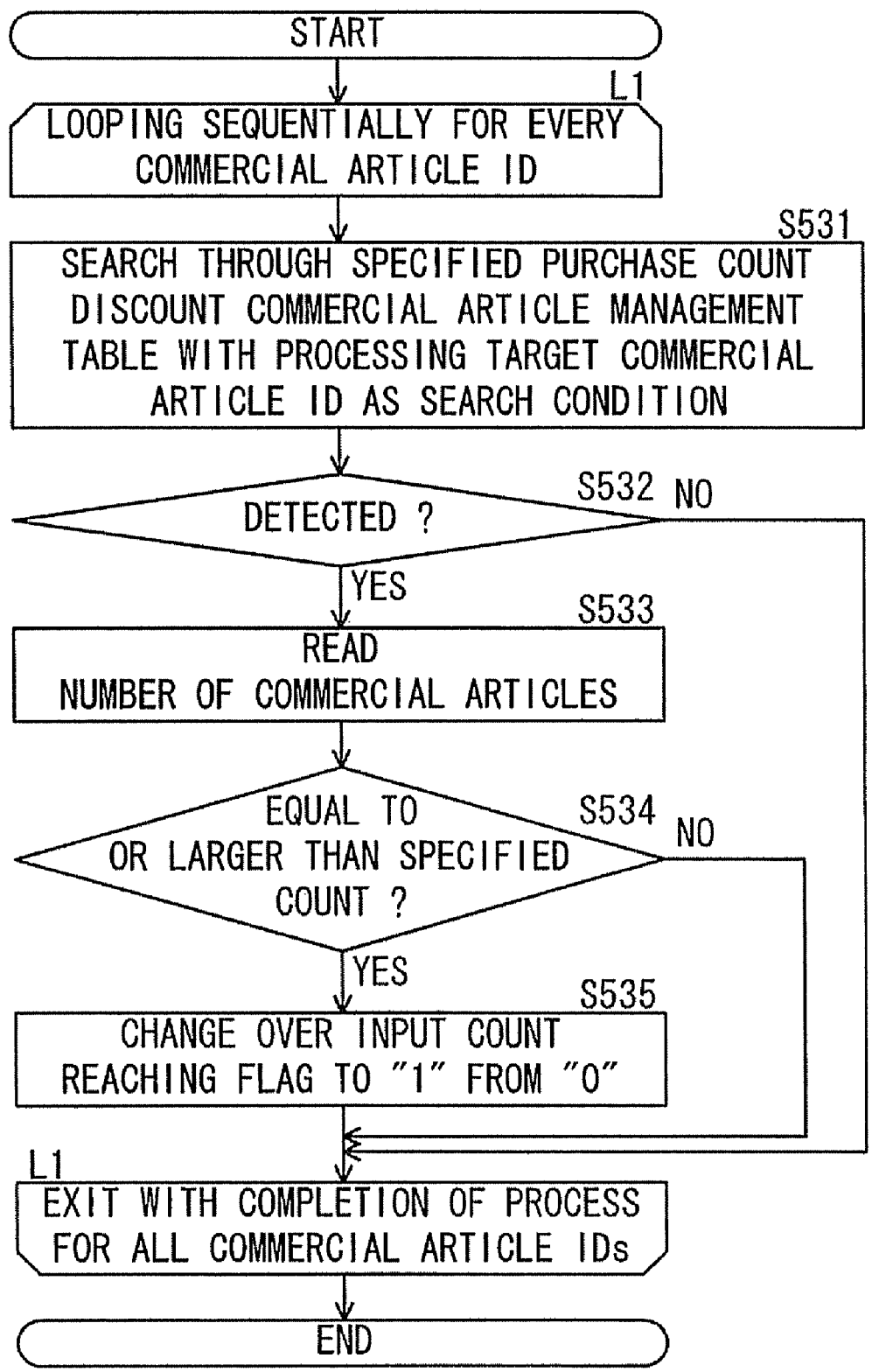
FIG. 20 is a flowchart illustrating a flow of a specified purchase count discount commercial article determining subroutine in the embodiment.

FIG. 20 is a flowchart illustrating a flow of the specified purchase count discount commercial article determining subroutine in the embodiment.

After starting the specified purchase count discount commercial article determining subroutine, the CPU 20*d* executes a first processing loop L1. In the first processing loop L1, the CPU 20*d* executes the processes organized by steps S531 through S535 sequentially with respect to each of all the commercial article IDs in the put-in commercial article list table 64 (see FIG. 6) specified in step S501 in FIG. 17.

In step S531, the CPU 20*d* searches through the specified purchase count discount commercial article management table 68 (see FIG. 9) to which the same shopping basket ID is allocated in a way that uses the processing target commercial article ID as a search condition.

In next step S532, the CPU 20*d* determines whether or not a record has been detected from the specified purchase count discount commercial article management table 68 as a result of the search in step S531. Then, if the record has not been detected from the specified purchase count discount commercial article management table 68, the CPU 20*d* divaricates the process from step S532, and terminates this round of the processing target in the first processing loop L1. On the other hand, if the record has been detected from the specified purchase count discount commercial article management table 68, the CPU 20*d* advances the process to step S533 from step S532.

In step S533, the CPU 20*d* reads the value (the number of pieces) given in the "number of pieces" field of the record containing the processing target commercial article ID in the put-in commercial article list table 64 specified in step S501.

In next step S534, the CPU 20*d* determines whether or not the number of pieces read in step S533 is equal to or larger than a value (a specified count) given in a "specified count" field of the record detected through the search in step S531. Then, if the number of pieces read in step S533 is less than the specified count, the CPU 20*d* divaricates the process from step S534, and finishes this round of the processing target in the first processing loop L1. While on the other hand, if the number of pieces read in step S533 is equal to larger than the specified count, the CPU 20d advances the process to step S535.

In step S535, the CPU 20d changes over the put-in count reaching flag contained in the record detected through the search in step S531 to "1" from "0". Thereafter, the CPU 20d terminates this round of the processing target in the first processing loop L1.

The CPU 20d, after finishing the processes organized by steps S531 through S535 with respect to all of the commercial article IDs in the put-in commercial article list table 64, exits the first processing loop L1, then terminates the specified purchase count discount commercial article determining subroutine in FIG. 20, and advances the process to step S504 in FIG. 17. In step S504, the CPU 20d executes an itemization screen data generating subroutine.

Figure 21:
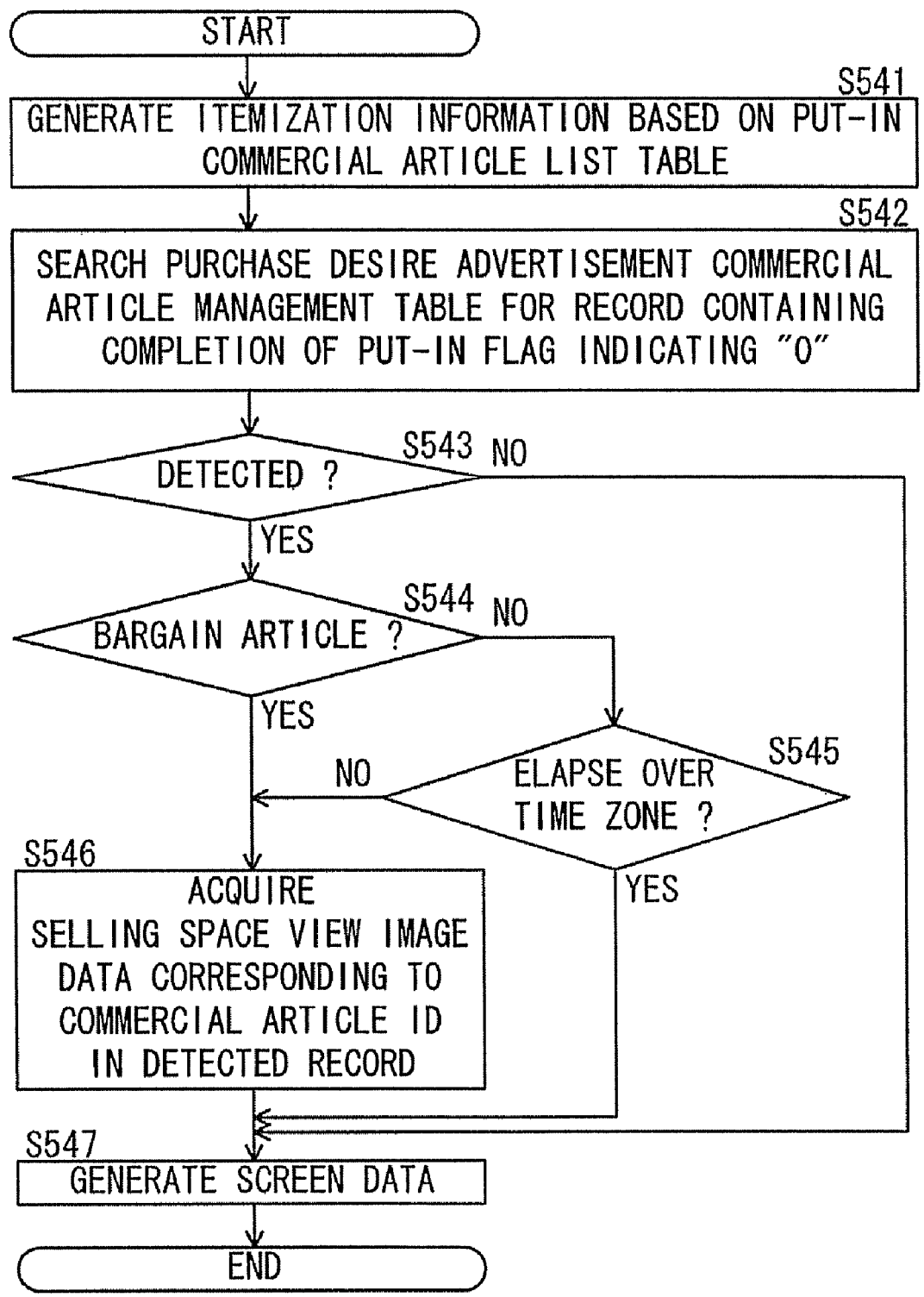

FIG. 21 is a flowchart illustrating a flow of the itemization screen data generating subroutine in the embodiment.

After starting the itemization screen data generating subroutine, in first step S541, the CPU 20d generates itemization information based on the contents of the put-in commercial article list table 64 specified in step S501 in FIG. 17. The itemization information contains a name of commercial article and a subtotal (unit price×number of pieces−total amount of discount), and further contains a sum of the subtotals.

In next step S542, the CPU 20d searches through the purchase desire advertisement commercial article management table 66 to which the same shopping basket ID is allocated in a way that uses a put-in completion flag in a status of "0" as a search condition.

In next step S543, the CPU 20d determines whether or not the record is detected from the purchase desire advertisement commercial article management table 66 as a result of the search in step S542. Then, if the record is not detected from the purchase desire advertisement commercial article management table 66, the CPU 20d advances the process to step S547 from step S543. On the other hand, if the record is detected from the purchase desire advertisement commercial article management table 66, the CPU 20d advances the process to step S544.

In step S544, the CPU 20d determines, based on a value (of the advertisement category flag) given in the "advertisement category flag" field of the record detected through the search in step S542, whether the advertisement commercial article related to the detected record is a bargain article or a time-limited special offer article. Then, if the advertisement commercial article related to the detected record is the bargain article, the CPU 20d advances the process to step S546. On the other hand, if the advertisement commercial article related to the detected record is the time-limited special offer article, the CPU 20d advances the process to step S545 from step S544.

In step S545, the CPU 20d determines whether or not the present time elapses over the time zone contained in the record detected through the search in step S542. Then, if the present time elapses over the time zone, the CPU 20d advances the process to step S547. On the other hand, if the present time does not elapse over the time zone, the CPU 20d advances the process to step S546 from step S545.

In step S546, the CPU 20d reads the record containing the same commercial article ID as the ID contained in the record detected through the search in step S542 from the commercial article information management table 63 (see FIG. 5), and acquires the selling space view image data 62 from the storage unit 20c on the basis of the value in the "view of selling space" field of the readout record. Thereafter, the CPU 20d advances the process to step S547.

In step S547, the CPU 20d generates, based on the itemization information generated in step S541, itemization screen data for displaying an unillustrated itemization screen. In the embodiment, listing of the names of commercial articles and the subtotals is made per commercial article on the unillustrated itemization screen, and a sum of the subtotals is described thereon. Further, the CPU 20d, if the selling space view image data 62 at that point of time is acquired (if via step S546), generates the selling space view image data 62 itself or generates the itemization screen data so that the itemization screen contains a thumbnail functioning as a means (e.g., a link button) for acquiring the selling space view image data 62 and a purport of showing a forget-to-buy commercial article. After generating this type of itemization screen data, the CPU 20d terminates the itemization screen data generating subroutine in FIG. 21, and advances the process to step S505 in FIG. 17.

It should be noted that the CPU 20d executing these steps S501 through S504 corresponds to the generating unit described above.

In step S505, the CPU 20d transmits the itemization screen data generated in step S504 (step S547) to the shopping basket device 50 specified by the received shopping basket ID. Thereafter, the CPU 20d finishes the shopping basket management process in FIG. 17.

It should be noted that the CPU 20d executing step S505 corresponds to the second transmitting unit described above.

<Counter Area Enter/Exit Detection>

When the main power source of the shopping basket device 50 turns on, the CPU 50g reads the counter area enter/exit detection program 53 from the flash memory unit 50f, and starts the counter enter/exit detection process.

Figure 22:
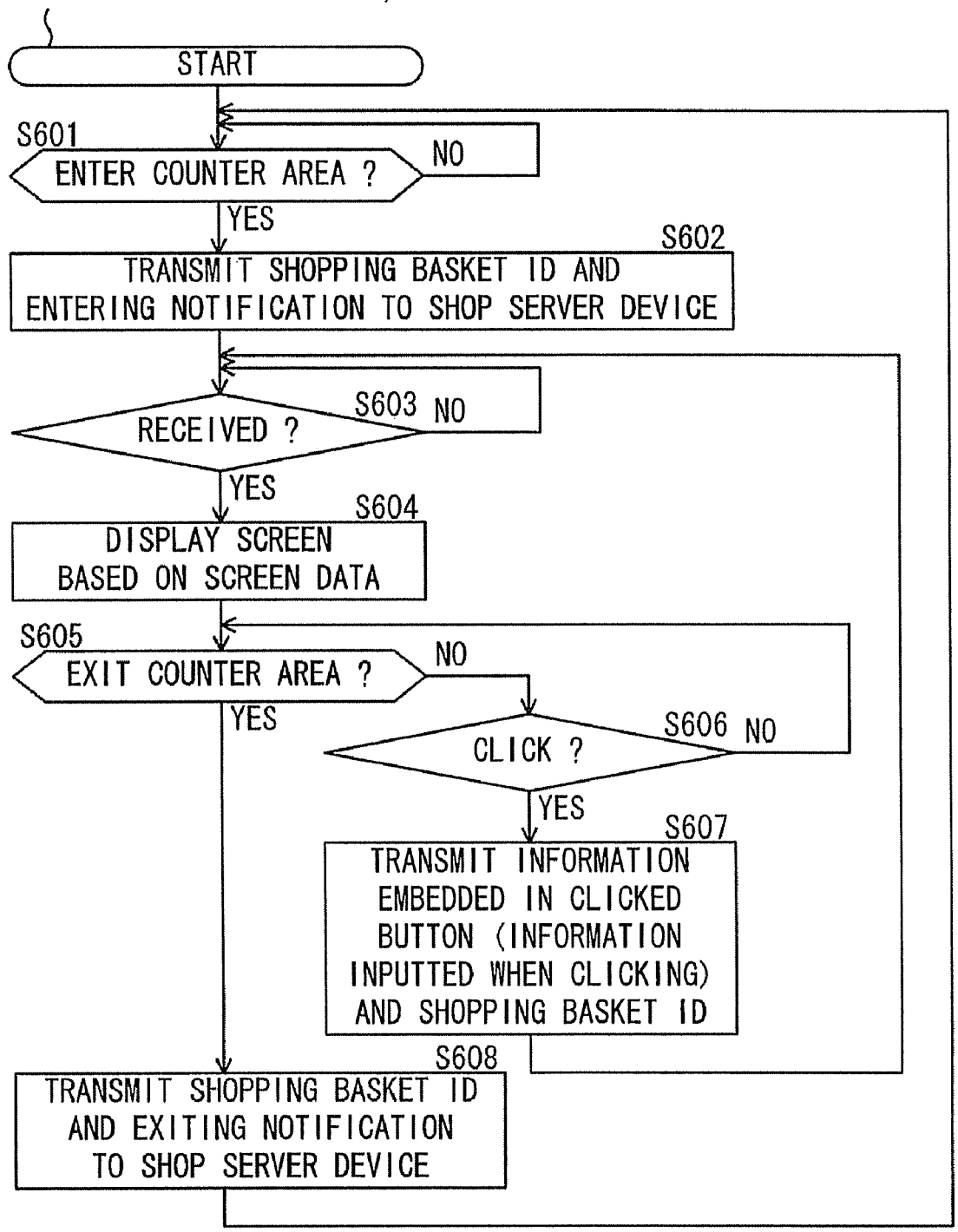
FIG. 22 is a flowchart illustrating a flow of a counter enter/exit detection process in the embodiment.

FIG. 22 is a flowchart illustrating a flow of the counter enter/exit detection process in the embodiment.

After starting the counter enter/exit detection process, in first step S601, the CPU 50g stands by till the shopping basket device 50 enters the counter area. Note that the entrance into the counter area is detected from establishing the wireless connection between the wireless LAN unit 50e and the access point device 10 existing in the counter area. Then, when the shopping basket device 50 enters the counter area, the CPU 50g advances the process to step S602.

In step S602, the CPU 50g transmits the shopping basket ID of the shopping basket device 50 and entering notification to the shop server device 20 via the wireless LAN unit 50e, the access point device 10 and the network N1.

In next step S603, the CPU 50g stands by till the screen data is transmitted to the wireless LAN unit 50e from the shop server device 20 via the network N1 and the access point device 10. Then, when the screen data is received from the shop server device 20, the CPU 50g advances the process to step S604.

In step S604, the CPU 50g displays the screen based on the screen data received in step S603. Thereafter, the CPU 50g advances the process to step S605.

In step S605, the CPU 50g determines whether the shopping basket device 50 exits the counter area or not. Note that the exit from the counter area is detected from a wireless disconnection between the wireless LAN unit 50e and the access point device 10 existing in the counter area. Then, if the shopping basket device 50 does not exit the counter area, the CPU 50g advances the process to step S606 from step S605.

In step S606, the CPU 50g determines whether or not the button is clicked (touched) on the screen displayed in step S604. Subsequently, if the button is not clicked on the screen displayed in step S604, the CPU 50g advances the process from step S606 and loops back the process to step S605.

During the execution of the processing loop in steps S605 and S606, if the button is clicked (touched) on the screen displayed in step S604, the CPU 50g advances the process to step S607 from step S606.

In step S607, the CPU 50g transmits, to the shop server device 20, the information embedded in the clicked (touched) button, the information inputted if the information is inputted to the input box such as the text box at the point of time when clicked (touched), and the shopping basket ID via the wireless LAN unit 50e, the access point device 10 and the network N1. Thereafter, the CPU 50g loops back the process to step S603, and returns to the status of standing by till the screen data is transmitted from the shop server device 20.

Further, during the execution of the processing loop consisting of steps S605 and S606, if the self-machine exits the counter area, the CPU 50g advances the process to step S608 from step S605.

In step S608, the CPU 50g transmits the shopping basket ID of the self-machine and the exiting notification to the shop server device 20 via the wireless LAN unit 50e, the access point device 10 and the network N1. Thereafter, the CPU 50g loops back the process to step S601 and returns to the status of standing by till the self-machine enters the counter area.

<Settlement>

A scheme of the shop server device 20 is that when the shopping basket ID and the entering notification (step S602) are transmitted from the shopping basket device 50, with this transmission as a trigger, the CPU 20d reads a settlement program 76 and starts a settlement process. Note that the CPU 20d, when receiving the entering notification from the plurality of shopping basket devices 50, executes the settlement processes in parallel with respect to the individual shopping basket devices 50.

FIGS. 23, 24, 25, 26, 27, 28 and 29 are flowcharts each illustrating the settlement process in the embodiment.

After starting the settlement process, in first step S701, the CPU 20d transmits settlement start instruction input screen data for displaying an unillustrated settlement start instruction input screen to the shopping basket device 50 specified by the received shopping basket ID via the network N1 and the access point device 10. In the embodiment, the unillustrated settlement start instruction input screen contains a settlement button for starting a settlement procedure. The settlement button is embedded with information showing a settlement start instruction. Incidentally, the shopping basket device 50, upon receiving the settlement start instruction input screen data, displays the unillustrated settlement start instruction input screen on the display unit 50a (step S604).

In next step S702, the CPU 20d determines whether or not the exiting notification (step S608) is transmitted from the shopping basket device 50. Then, if the exiting notification is not transmitted from the shopping basket device 50, the CPU 20d advances the process to step S703 from step S702.

In step S703, the CPU 20d determines whether the information transmitted from the shopping basket device 50 by clicking (touching) the settlement button on the unillustrated settlement start instruction input screen is received or not. Then, if the information is not received from the shopping basket device 50, the CPU 20d advances the process from step S703 and loops back the process to step S702.

During the execution of the processing loop consisting of steps S702 and S703, when receiving the exiting notification from the shopping basket device 50, the CPU 20d terminates the settlement process in FIGS. 23 through 29.

Figure 24:
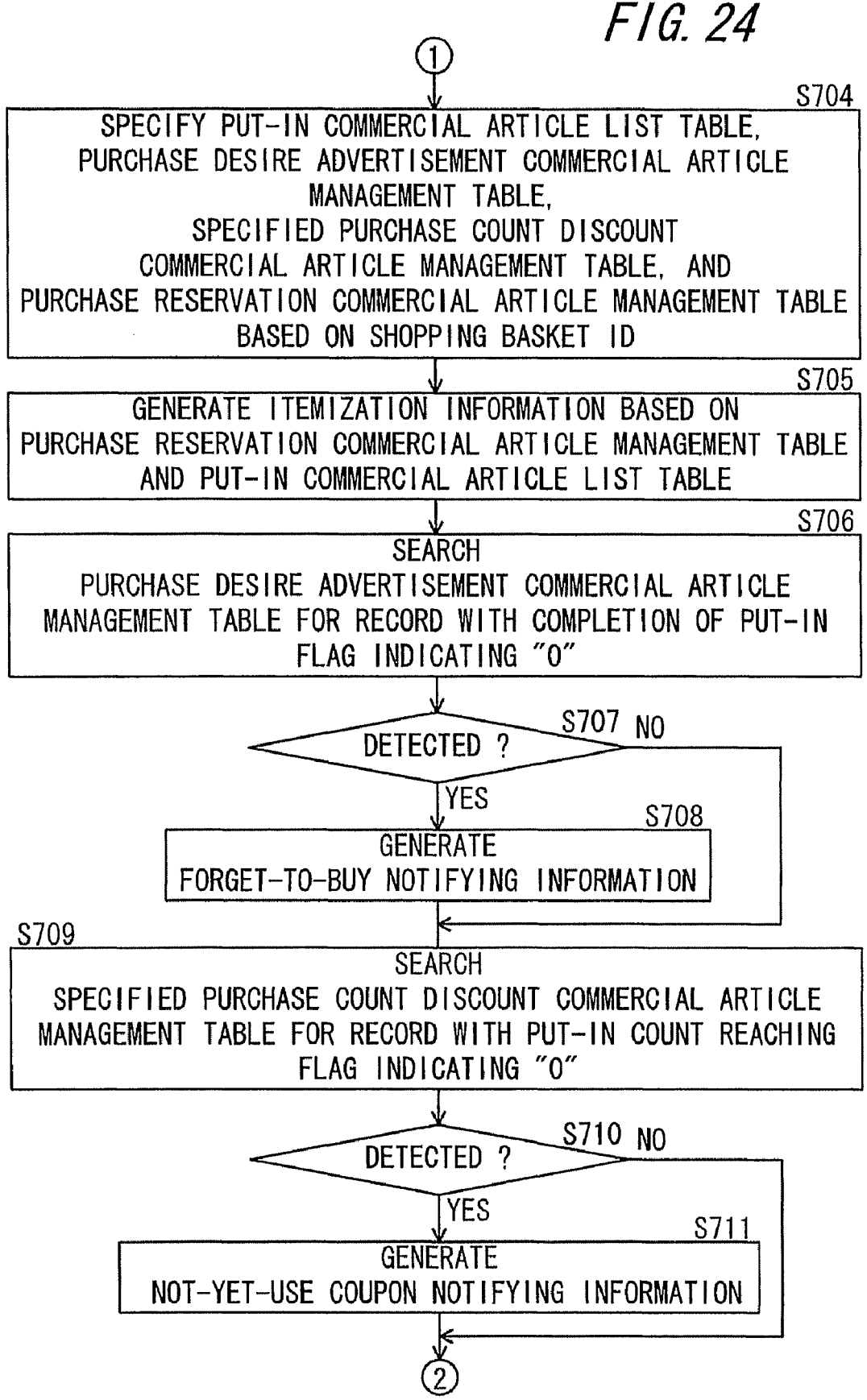
FIG. 24 is a flowchart illustrating the settlement process in the embodiment.
Figure 25:
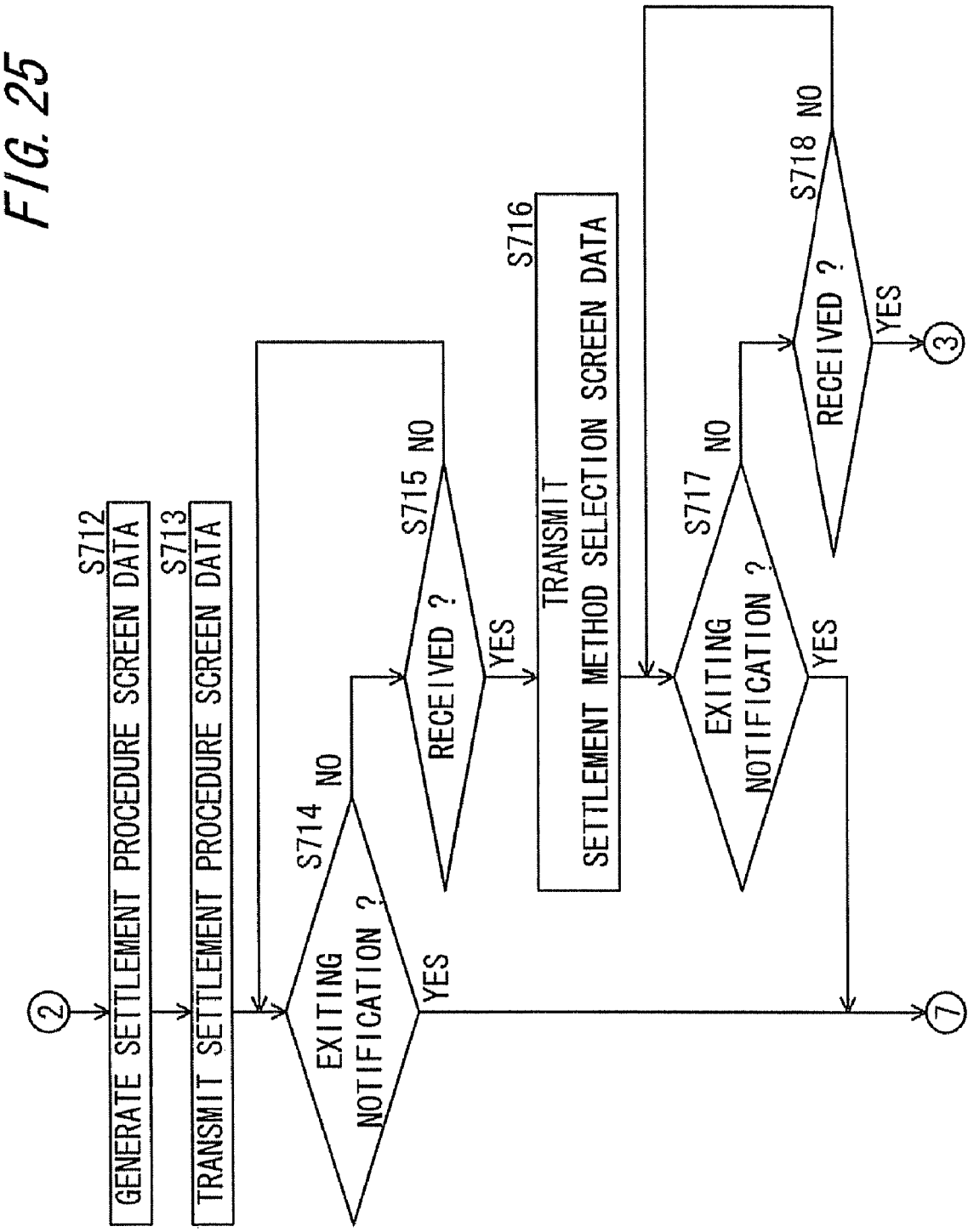
FIG. 25 is a flowchart illustrating the settlement process in the embodiment.

Further, during the execution of the processing loop consisting of steps S702 and S703, when receiving the information transmitted from the shopping basket device 50 by clicking (touching) the settlement button on the unillustrated settlement start instruction input screen, the CPU 20d advances the process to step S704 in FIG. 24 from step S703.

In step S704, the CPU 20d specifies, based on the received shopping basket ID, the put-in commercial article list table 64 (see FIG. 6), the purchase desire advertisement commercial article management table 66 (see FIG. 8), the specified purchase count discount commercial article management table 68 (see FIG. 9) and the purchase reserved commercial article management table 69 (see FIG. 10).

In next step S705, the CPU 20d generates the itemization information based on the contents of the purchase reserved commercial article management table 69 and the put-in commercial article list table 64 specified in step S704. As described above, the itemization information contains the name of commercial article and the subtotal (unit price× number of pieces−total amount of discount), and further contains the sum of the subtotals. Note that with respect to each of the records of the purchase reserved commercial article management table 69, the CPU 20d also executes a process of reading the unit price associated with the commercial article ID from the commercial article information management table 63 (see FIG. 5) and calculating the total amount of discount in a way that multiplies the readout unit price by the discount rate.

In next step S706, the CPU 20d searches through the purchase desire advertisement commercial article management table 66 specified in step S704 by using the put-in completion flag showing the status of "0" as a search condition.

In subsequent step S707, the CPU 20d determines whether or not any record is detected from the purchase desire advertisement commercial article management table 66 as a result of the search in step S706. Then, if the record is not detected from the purchase desire advertisement commercial article management table 66, the CPU 20d advances the process to step S709 from step S707. On the other hand, if the record is detected from the purchase desire advertisement commercial article management table 66, the CPU 20d advances the process to step S708.

In step S708, the CPU 20d generates the forget-to-buy notifying information. The forget-to-buy notifying information is information for notifying a clearing person (purchaser) of the bargain article (advertisement commercial article) that is not yet inputted into the shopping basket in spite of desiring for the purchase. The forget-to-buy notifying information contains the commercial article ID and the name of commercial article associated with this commercial article ID, which are contained in the record detected through the search in step S706. After generating the forget-to-buy notifying information, the CPU 20d advances the process to step S709.

In step S709, the CPU 20d searches through the specified purchase count discount commercial article management table 68 specified in step S704 by employing the put-in count reaching flag showing the status of "0" as a search condition.

In next step S710, the CPU 20d determines whether or not any record is detected from the specified purchase count discount commercial article management table 68 as a result of the search in step S709. Then, if the record is not detected from the specified purchase count discount commercial article management table 68, the CPU 20d advances the process to step S712 in FIG. 25 from step S710. While on the other hand, if the record is detected from the specified purchase count discount commercial article management table 68, the CPU 20d advances the process to step S711.

In step S711, the CPU 20d generates not-yet-used coupon notifying information. The not-yet-used coupon notifying information is information for notifying the clearing person (purchaser) of a specified count of discount commercial articles (coupon commercial articles) that are not yet inputted by a specified count into the shopping basket in spite of having acquired this category of commercial article. The not-yet-used coupon notifying information contains the commercial article ID and the name of commercial article associated with the commercial article ID that are contained in the record detected through the search in step S709. After generating the not-yet-used coupon notifying information, the CPU 20d advances the process to step S712 in FIG. 25.

In step S712, the CPU 20d generates, based on the itemization information generated in step S705, settlement procedure screen data for displaying an unillustrated settlement procedure screen. In the embodiment, on the unillustrated settlement procedure screen, listing of the name of commercial article and a subtotal is made per commercial article, and a sum of the subtotals is described thereon. Furthermore, the unillustrated settlement procedure screen contains a proceed button for proceeding with the settlement procedure. The proceeding button is embedded with information showing an instruction to proceed with the settlement procedure. Note that the CPU 20d, if the forget-to-buy notifying information is generated at this point of time (if via step S708), generates the settlement procedure screen data so that the forget-to-buy notifying information is contained in the settlement procedure screen. Further, the CPU 20d, if the not-yet-used coupon notifying information is generated at this point of time (if via step S711), generates the settlement procedure screen data so that the not-yet-used coupon notifying information is contained in the settlement procedure screen.

In next step S713, the CPU 20d transmits the settlement procedure screen data generated in step S712 to the shopping basket device 50 specified by the received shopping basket ID. Note that the shopping basket device 50, upon receiving the settlement procedure screen data, displays the unillustrated settlement procedure screen on the display unit 50a (step S604).

In subsequent step S714, the CPU 20d determines whether or not the exiting notification is transmitted from the shopping basket device 50 (step S608). Then, if the exiting notification is not transmitted from the shopping basket device 50, the CPU 20d advances the process to step S715 from step S714.

In step S715, the CPU 20d determines whether the information transmitted from the shopping basket device 50 by clicking (touching) the proceeding button on the unillustrated settlement procedure screen is received or not. Then, if the information is not received from the shopping basket device 50, the CPU 20d advances the process from step S715 and loops back the process to step S714.

Figure 23:
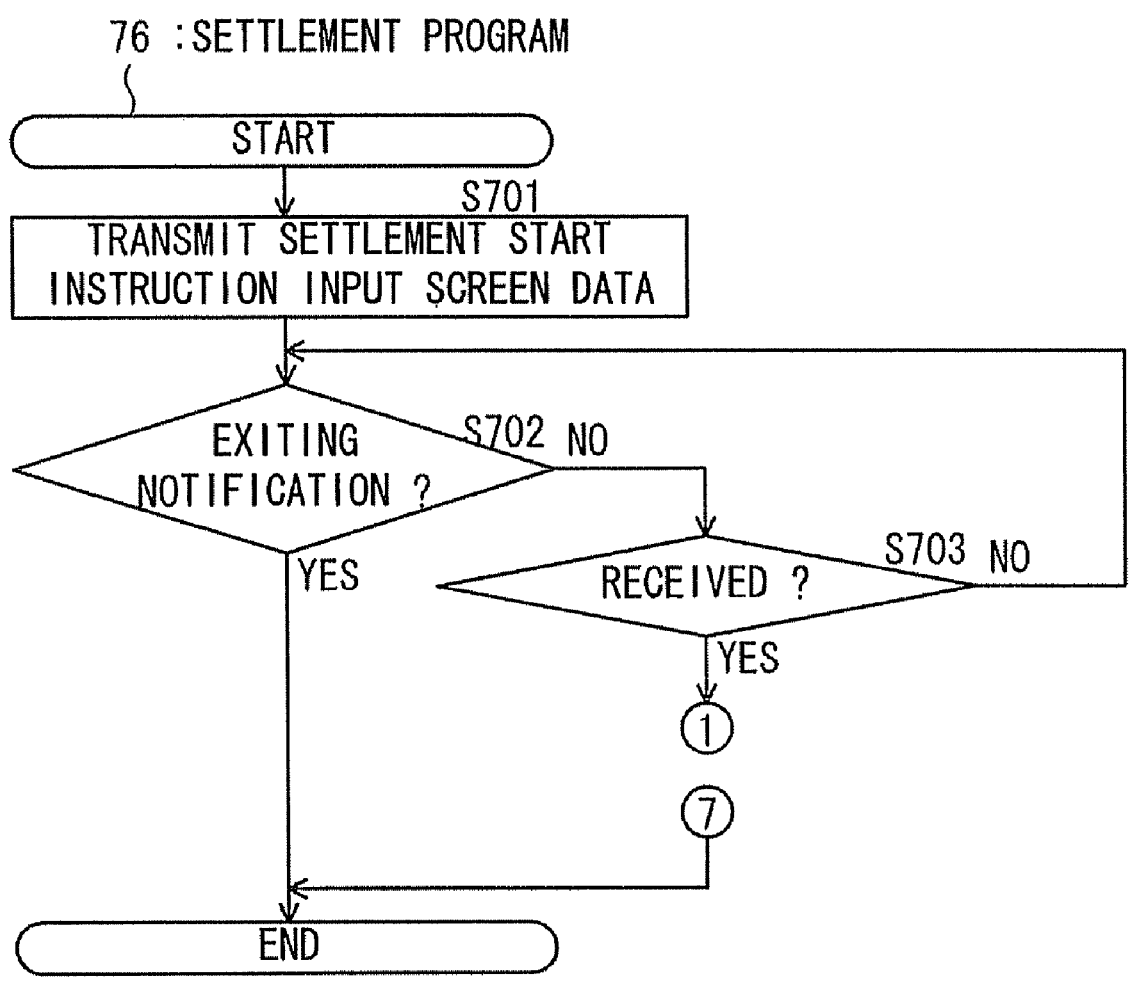
FIG. 23 is a flowchart illustrating a settlement process in the embodiment.

During the execution of the processing loop consisting of step S714 and S715, when receiving the exiting notification from the shopping basket device 50, the CPU 20d terminates the settlement process in FIGS. 23 trough 29.

Moreover, during the execution of the processing loop consisting of step S714 and S715, when receiving the information transmitted from the shopping basket device 50 by clicking (touching) the proceed button on the unillustrated settlement procedure screen, the CPU 20d advances the process to step S716 from step S715.

In step S716, the CPU 20d transmits settlement method selection screen data for displaying an unillustrated settlement method selection screen to the shopping basket device 50 specified by the received shopping basket ID via the network N1 and the access point device 10. In the embodiment, the unillustrated settlement method selection screen contains two pieces of selection buttons. The first button is a button for selecting clearance of a purchase price with a surplus registered in the RFIC card by holding the RFIC card up to (beams of light of) the RFIC card reader unit 50d. The second button is a button for selecting the clearance of the purchase price by paying the cash to the worker (counter clerk). Each of the selection buttons is embedded with the information showing the type of the settlement method. Note that the shopping basket device 50, upon receiving the settlement method selection screen data, displays the unillustrated settlement method selection screen on the display unit 50a (step S604).

In next step S717, the CPU 20d determines whether or not the exiting notification is received from the shopping basket device 50 (step S608). Then, if the exiting notification is not received from the shopping basket device 50, the CPU 20d advances the process to step S718 from step S717.

In step S718, the CPU 20d determines whether the information transmitted from the shopping basket device 50 by clicking (touching) the selection button on the unillustrated settlement method selection screen is received or not. Subsequently, if the information is not received from the shopping basket device 50, the CPU 20d advances the process from step S718 and loops back the process to step S717.

During the execution of the processing loop consisting of steps S717 and S718, when receiving the exiting notification from the shopping basket device 50, the CPU 20d terminates the settlement process in FIGS. 23 through 29.

Figure 26:
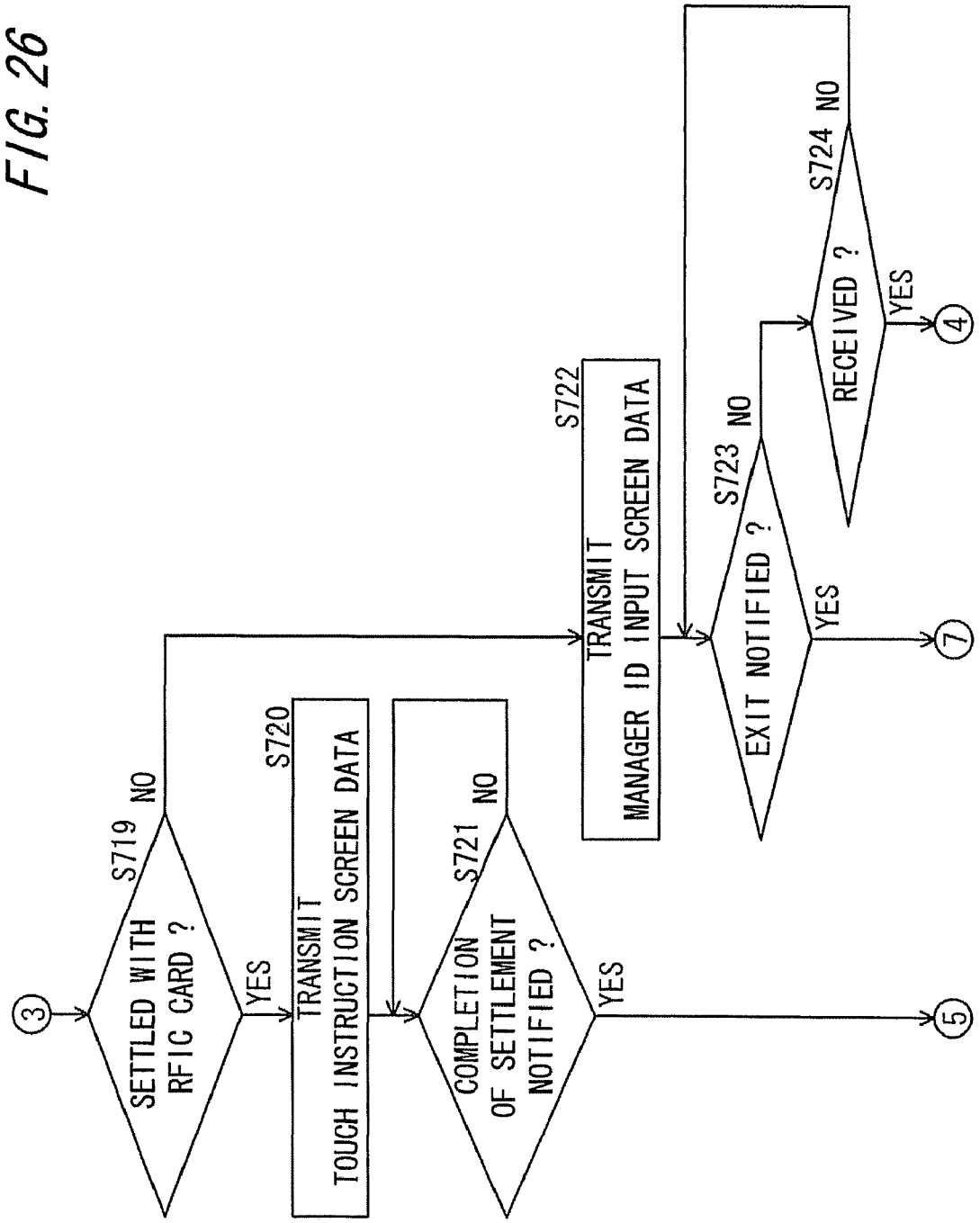
FIG. 26 is a flowchart illustrating the settlement process in the embodiment.

Moreover, during the execution of the processing loop consisting of steps S717 and S718, when receiving the information transmitted from the shopping basket device 50 by clicking (touching) the selection button on the unillustrated settlement method selection screen, the CPU 20d advances the process to step S719 in FIG. 26 from step S718.

In step S719, the CPU 20d determines whether or not the button clicked (touched) on the unillustrated settlement method selection screen is the button for selecting the clearance with the RFIC card. Then, if the button clicked (touched) on the unillustrated settlement method selection screen is the button for selecting the clearance with the RFIC card, the CPU 20d advances the process to step S720.

In next step S720, the CPU 20d transmits touch instruction screen data for displaying an unillustrated touch instruction screen to the shopping basket device 50 specified by the received shopping basket ID via the network N1 and the access point device 10. In the embodiment, the unillustrated touch instruction screen contains a description of a purport showing an instruction of holding the RFIC card owned by the clearing person (purchaser) up to the RFIC card reader unit 50d of the shopping basket device 50. Note that the shopping basket device 50, when receiving this touch instruction screen data, displays the unillustrated touch instruction screen on the display unit 50a (step S604). Moreover, a scheme is that when the clearing person (purchaser) holds his or her own RFIC card up to the RFIC card reader unit 50d, the shopping basket device 50 reads a dedicated code from the RFIC card of the clearing person via the RFIC card reader unit 50d, and transmits the readout dedicated code to an unillustrated clearance server device. A further scheme is that the clearance server device collates the dedicated code sent from the shopping basket device 50 with a registered code and, if authenticated, acquires clearance information from the shop server device 20, then subtracts a total amount of money from the surplus money of the clearing person, and transmits notification purporting that the settlement has been completed to the shop server device 20. The shopping basket device 50 and the shop server device 20 are preinstalled with software for realizing the clearance function using the RFIC card.

In next step S721, the CPU 20*d* stands by till the notification purporting that the settlement has been completed is received from the unillustrated clearance server device. Then, when receiving the notification purporting that the settlement has been completed from the unillustrated clearance server device, the CPU 20*d* advances the process to step S732 in FIG. 28.

On the other hand, in step S719, if the clicked (touched) button on the unillustrated settlement method selection screen is not the button for selecting the settlement with the RFIC card (i.e., if the touched button is the button for selecting the settlement in cash), the CPU 20*d* advances the process to step S722 from step S719.

In step S722, the CPU 20*d* transmits manager ID input screen data for displaying an unillustrated manager ID input screen to the shopping basket device 50 specified by the received shopping basket ID via the network N1 and the access point device 10. In the embodiment, the unillustrated manager ID input screen contains the input box such as the text box for inputting the secret code number, the ten keys and the proceed button for proceeding with the settlement procedure. The proceeding button is embedded with the information showing the instruction of proceeding with the settlement procedure. Note that the shopping basket device 50, upon receiving the manager ID input screen data, displays the unillustrated manager ID input screen on the display unit 50*a*. The worker (counter clerk) existing at the counter receives the shopping basket from the clearing person (purchaser), then inputs a manger's own manger ID to the input box by touching the ten keys on the unillustrated manager ID input screen displayed on the display unit 50*a* by the shopping basket device 50 of the shopping basket, and clicks (touches) the proceeding button, at which time the shopping basket device 50 transmits the information showing the instruction of proceeding with the settlement procedure, the manager ID given in the input box and the shopping basket ID to the shop server device 20 (step S607).

In next step S723, the CPU 20*d* determines whether or not the exiting notification is received from the shopping basket device 50 (step S608). Then, if the exiting notification is not received from the shopping basket device 50, the CPU 20*d* advances the process to step S724 from step S723.

In step S724, the CPU 20*d* determines whether the information transmitted from the shopping basket device 50 by clicking (touching) the proceed button on the unillustrated manager ID input screen is received or not. Subsequently, if the information is not received from the shopping basket device 50, the CPU 20*d* advances the process from step S724, and loops back the process to step S723.

During the execution of the processing loop consisting of steps S723 and S724, when receiving the exiting notification from the shopping basket device 50, the CPU 20*d* terminates the settlement process in FIGS. 23 through 29.

Figure 27:
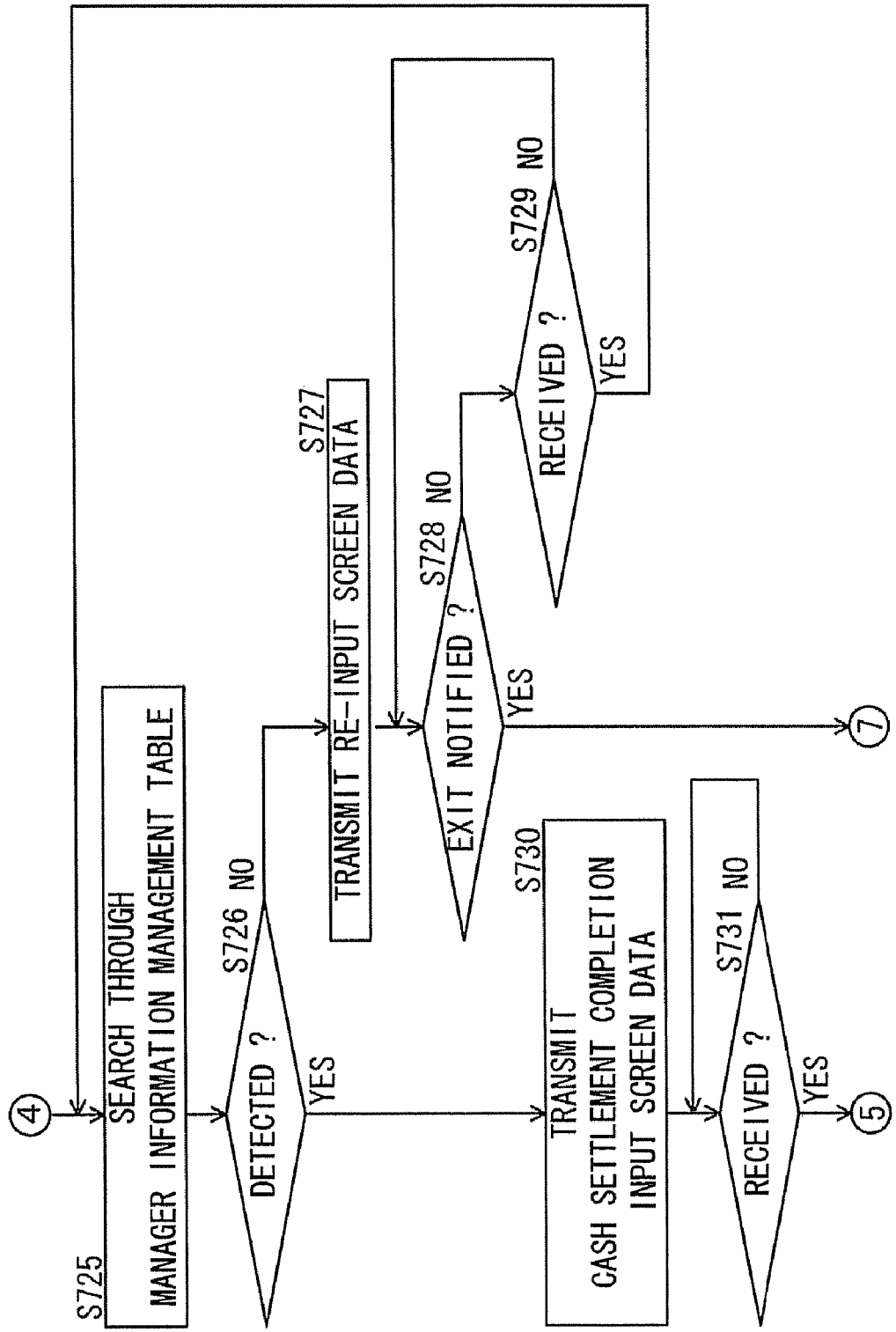
FIG. 27 is a flowchart illustrating the settlement process in the embodiment.
Figure 28:
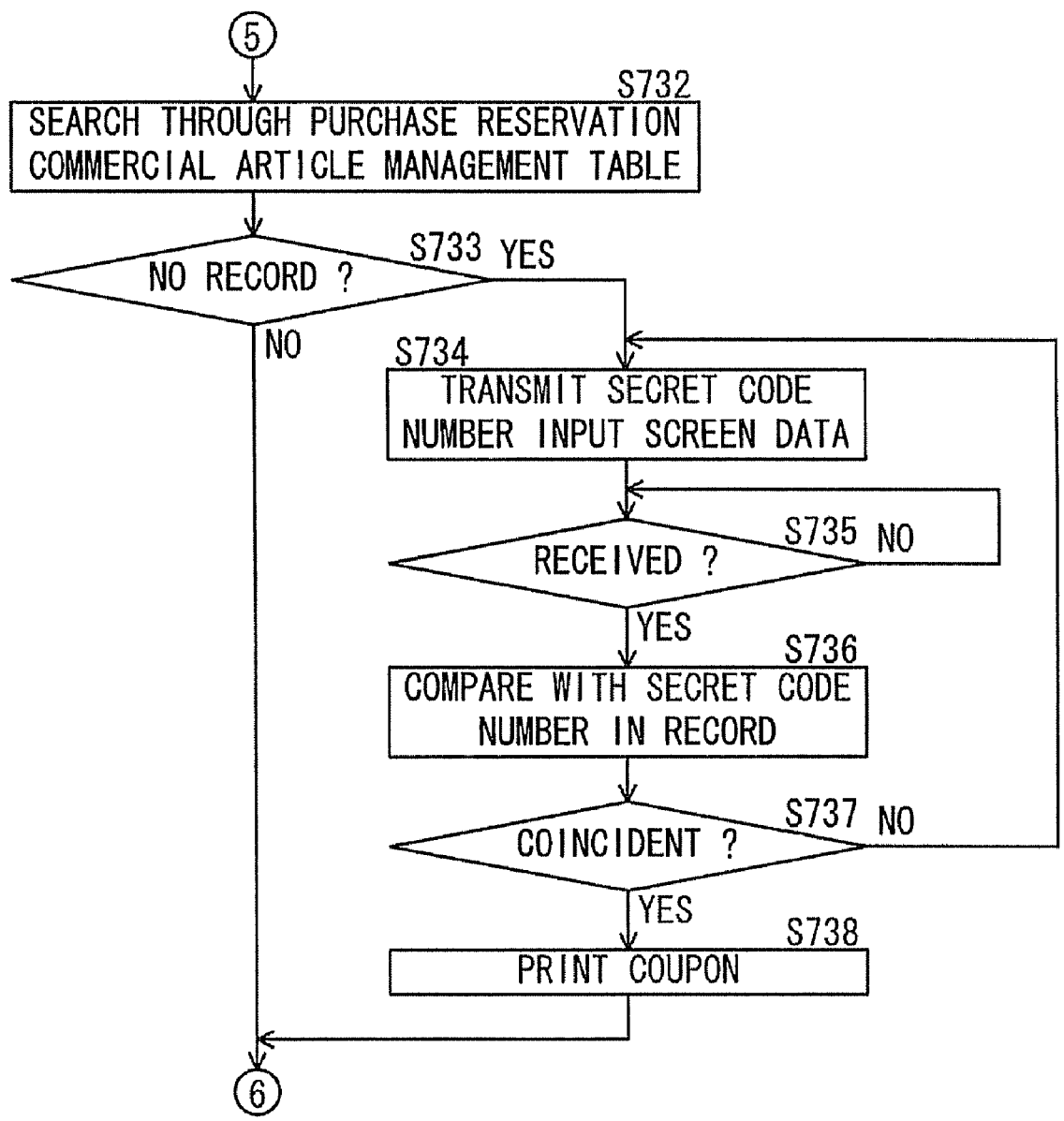
FIG. 28 is a flowchart illustrating the settlement process in the embodiment.
Figure 29:
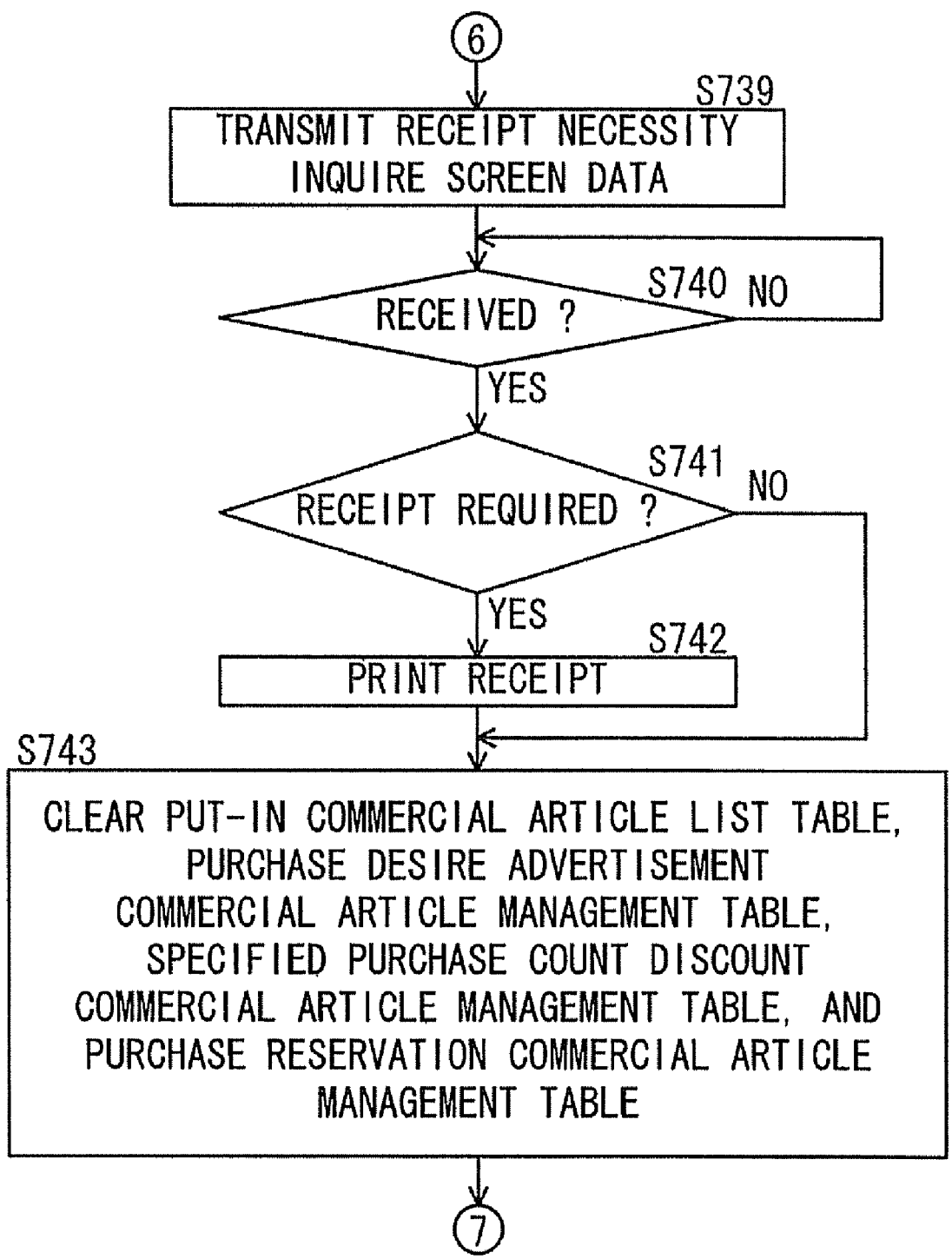
FIG. 29 is a flowchart illustrating the settlement process in the embodiment.

Further, during the execution of the processing loop consisting of steps S723 and S724, when receiving the information transmitted from the shopping basket device 50 by clicking (touching) the proceed button on the unillustrated manager ID input screen, the CPU 20*d* advances the process to step S725 in FIG. 27 form step S724.

In step S725, the CPU 20*d* searches through the manager information management table 61 (see FIG. 4) in a way that uses the manager ID received from the shopping basket device 50 in step S724 as a search condition.

In next step S726, the CPU 20*d* determines whether or not any record is detected from the manager information management table 61. Then, if the record is not detected from the manager information management table 61, the CPU 20*d* advances the process to step S727 from step S726.

In step S727, the CPU 20*d* transmits re-input screen data for displaying an unillustrated re-input screen to the shopping basket device 50 specified by the received shopping basket ID via the network N1 and the access point device 10. The unillustrated re-input screen has absolutely the same structure as the unillustrated manager ID input screen has. Accordingly, the worker (counter clerk) existing at the counter receives the shopping basket from the clearing person (purchaser), then inputs the manger's own manger ID to the input box by touching the ten keys on the unillustrated manager ID input screen displayed on the display unit 50*a* by the shopping basket device 50 of the shopping basket, and clicks (touches) the proceed button, at which time the shopping basket device 50 transmits the information showing the instruction of proceeding with the settlement procedure, the manager ID given in the input box and the shopping basket ID to the shop server device 20 (step S607).

In next step S728, the CPU 20*d* determines whether or not the exiting notification is received from the shopping basket device 50 (step S608). Then, if the exiting notification is not received from the shopping basket device 50, the CPU 20*d* diverts the process to step S729 from step S728.

In step S729, the CPU 20*d* determines whether the information transmitted from the shopping basket device 50 by clicking (touching) the proceeding button on the unillustrated re-input screen is received or not. Subsequently, if the information is not received from the shopping basket device 50, the CPU 20*d* advances the process from step S729, and loops back the process to step S728.

During the execution of the processing loop consisting of steps S728 and S729, when receiving the exiting notification from the shopping basket device 50, the CPU 20*d* terminates the settlement process in FIGS. 23 through 29.

Further, during the execution of the processing loop consisting of steps S728 and S729, when receiving the information transmitted from the shopping basket device 50 by clicking (touching) the proceed button on the unillustrated re-input screen, the CPU 20*d* loops back the process to step S725 from step S729, and again searches through the manager information management table.

On the other hand, in step S726, if the record is detected from the manager information management table 61, the CPU 20*d* advances the process to step S730.

In step S730, the CPU 20*d* transmits settlement-in-cash completion input screen data for displaying an unillustrated settlement-in-cash completion input screen to the shopping basket device 50 specified by the received shopping basket ID via the network N1 and the access point device 10. In the embodiment, the unillustrated settlement-in-cash completion input screen contains a settlement completion button for completing the settlement procedure. The settlement completion button is embedded with information showing the completion of the settlement procedure. Note that the shopping basket device 50, upon receiving the settlement-in-cash completion input screen data, displays the settlement-in-cash completion input screen on the display unit 50*a*. The worker (counter clerk) existing at the counter, after receiving the cash from the clearing person (purchaser) and finishing the settlement, clicks (touches) the settlement completion button on the unillustrated settlement-in-cash completion input screen displayed on the display unit 50*a* by the shopping basket device 50, at which time the shopping basket device 50 transmits information showing the completion of the settlement procedure and the shopping basket ID to the shop server device 20 (step S607).

In next step S731, the CPU 20*d* stands by till the information showing the completion of the settlement procedure is received from the shopping basket device 50, which has transmitted the settlement-in-cash completion input screen data in step S730. Then, when receiving the information showing the completion of the settlement procedure, the CPU 20*d* advances the process to step S732 in FIG. 28.

In step S732, the CPU 20*d* searches the purchase reserved commercial article management table 69 (FIG. 10) for the record, which is specified in step S704.

In next step S733, the CPU 20*d* determines from a result of the search in step S732 whether or not the record is detected from the purchase reserved commercial article management table 69. Subsequently, if the record is not detected from the purchase reserved commercial article management table 69, the CPU 20*d* advances the process to step S739 in FIG. 29. On the other hand, if the record is detected from the purchase reserved commercial article management table 69, the CPU 20*d* advances the process to step S734 from step S733.

In step S734, the CPU 20*d* transmits secret code number input screen data for displaying an unillustrated secret code number input screen to the shopping basket device 50 specified by the received shopping basket ID via the network N1 and the access point device 10. In the embodiment, the unillustrated secret code number input screen contains the input box such as the text box for inputting the secret code number, the ten keys and a query button for completing a procedure for inputting the secret code number. The query button is embedded with information showing the completion of the procedure for inputting the secret code number. Note that the shopping basket device 50, when receiving the secret code number input screen data, displays the unillustrated secret code number input screen on the display unit 50*a*. When the clearing person (purchaser) inputs the secret code number to the input box by touching the ten keys on the unillustrated secret code number input screen displayed on the display unit 50*a* by the shopping basket device 50 and clicks (touches) the query button, the shopping basket device 50 transmits the information showing the completion of the procedure for inputting the secret code number, the secret code number given in the input box and the shopping basket ID to the shop server device 20 (step S607).

In next step S735, the CPU 20*d* stands by till the information showing the completion of the procedure for inputting the secret code number is received from the shopping basket device 50 which has transmitted the secret code number input screen data in step S734. Then, when receiving the information showing the completion of the procedure for inputting the secret code number from the shopping basket device 50, the CPU 20*d* advances the process to step S736.

In step S736, the CPU 20*d* compares the secret code number received from the shopping basket device 50 in step S735 with the secret code number contained in the record detected through the search in step S732.

In next step S737, the CPU 20*d* determines from this comparison whether or not the secret code numbers are coincident with each other. Subsequently, if the secret code numbers are not coincident with each other, the CPU 20*d* loops back the process to step S734 from step S737, the CPU 20*d* executes a process of accepting again the secret code number from the clearing person (purchaser). On the other hand, if the secret code numbers are coincident with each other, the CPU 20*d* advances the process to step S738.

In step S738, the CPU 20*d* acquires, based on the commercial article ID contained in the record detected through the search in step S732, the commercial article information on the reserved discount commercial article from the commercial article information management table 63, then generates print data for printing the coupon having a content based on the acquired commercial article information, and gets the print program 77 to execute the output of the generated print data to the printing device 30. Thereafter, the CPU 20*d* advances the process to step S739 in FIG. 29.

In step S739, the CPU 20*d* transmits receipt necessity inquire screen data for displaying an unillustrated receipt necessity inquire screen to the shopping basket device 50 specified by the received shopping basket ID via the network N1 and the access point device 10. In the embodiment, the unillustrated receipt necessity inquire screen contains a receipt button for outputting a receipt and a non-necessity button for completing the procedure at the counter without outputting the receipt. The receipt button is embedded with information showing an instruction of printing the receipt. The non-necessity button is embedded with information showing that the receipt is unnecessary. Note that the shopping basket device 50, upon receiving the receipt necessity inquire screen data, displays the unillustrated receipt necessity inquire screen on the display unit 50*a*. When the clearing person (purchaser) clicks (touches) the receipt button or the non-necessity button on the unillustrated receipt necessity inquire screen displayed on the display unit 50*a* by the shopping basket device 50, the shopping basket device 50 transmits the information embedded in the clicked button and the shopping basket ID to the shop server device 20 (step S607).

In next step S740, the CPU 20*d* stands by till the information embedded in the clicked button is received from the shopping basket device 50 which has transmitted the receipt necessity inquire screen data in step S739. Then, when receiving the information embedded in the clicked button from the shopping basket device 50, the CPU 20*d* advances the process to step S741.

In step S741, the CPU 20*d* determines whether or not the information received from the shopping basket device 50 in step S740 is the information showing the instruction of printing the receipt. Subsequently, if the information received from the shopping basket device 50 in step S740 is not the information showing the instruction of printing the receipt (i.e., if the information concerned is the information showing that the receipt is not necessary), the CPU 20*d* advances the process to step S743 from step S741. On the other hand, if the information received from the shopping basket device 50 in step S740 is the information showing the instruction of printing the receipt, the CPU 20*d* advances the process to step S742.

In step S742, the CPU 20*d* generates the print data for printing the receipt having the content based on the itemization information generated in step S705, and makes the print program 77 execute the output of the generated print data to the printing device 30. Thereafter, the CPU 20*d* advances the process to step S743.

In step S743, the CPU 20*d* executes a clearing process of deleting all of the records from the input commercial article list table 64 (see FIG. 6), the purchase desire advertisement commercial article management table 66 (see FIG. 8), the specified purchase count discount commercial article management table 68 (see FIG. 9) and the purchase reserved commercial article management table 69 (see FIG. 10), which are specified in step S704. Thereafter, the CPU 20*d* terminates the settlement process in FIGS. 23 through 29.

<<Operational Effect>>

<Reduction of Load>

According to the shop system in the embodiment, when the purchaser inputs and takes the commercial article into and out of the shopping basket in a place other than the counter area, the input commercial article list table 64 associated with this shopping basket is updated corresponding thereto (steps S401-S404, S501, S502, S511-S517, S519, S520) with the result that the contents of the itemization screen displayed on the display unit 50a of the shopping basket device 50 are changed (steps s504, S541, S547, S505).

At this time, the shopping basket device 50 executes only the process of acquiring the tag ID from the electronic tag 40 within the shopping basket and transmitting the tag ID to the shop server device 20, and the process of displaying the screen based on the screen data transmitted from the shop server device 20; and, on the other hand, the shop server device 20 executes the process of temporarily storing the tag ID acquired from the electronic tag 40 of the commercial article within the shopping basket by the shopping basket device 50, the process of reading the name of commercial article and the unit price associated with the temporarily-stored tag ID, the process of totalizing the total amounts, and the process of generating the detail screen data and the settlement procedure screen data.

Hence, according to the shop system in the embodiment, the processing load applied to the shopping basket device 50 is reduced to a greater degree than on the conventional shopping basket device 50 carrying out the variety of processes.

<Prevention of Forget-to-Buy Action>

Further, according to the shop system in the embodiment, when the predetermined date/time (the advertisement timing) is reached, the advertisement screen data 65 is distributed to each shopping basket device 50, and the advertisement screen 81 is presented to the purchaser (steps S201-S203, S101, S102). When the purchaser touches the commercial article button 81a on the advertisement screen 81, the advertisement commercial article (the bargain article or the time-limited special offer article) linked to the commercial article button 81a is registered as the desire-to-purchase commercial article in the purchase desire advertisement commercial article management table 66 (S103, S104, S211-S214). Then, when generating the itemization screen data, if the commercial article, which is not yet inputted into the shopping basket, is included in the commercial articles registered in the purchase desire advertisement commercial article management table 66 (till the special offer time elapses with respect to the time-limited special offer article), the scheme is that this purport and the selling space view for this commercial article are displayed on the unillustrated itemization screen (steps S542-S547). Further, when making the settlement, if the commercial article, which is not yet inputted into the shopping basket, is included in the commercial articles registered in the purchase desire advertisement commercial article management table 66, the scheme is such that this purport is displayed on the settlement procedure screen (S706-S708, S712).

Therefore, according to the shop system in the embodiment, it does not happen that the purchaser forgets to buy the desire-to-buy commercial article in the advertisement commercial articles displayed on the advertisement screen 81.

<Prevention of Forget-to-Use Coupon Action>

Moreover, according to the shop system in the embodiment, when the predetermined date/time (the distribution timing) is reached, the coupon screen data 67 is distributed to each shopping basket device 50, and the unillustrated coupon screen is presented to the purchaser (steps S301-S303, S101, S102). When the purchaser touches the commercial article button of the specified purchase count discount commercial article in the commercial article buttons on the unillustrated coupon screen, the coupon commercial article (the specified purchase count discount commercial article) linked to this commercial article button is registered as the commercial article with the desire for receiving the application of the coupon in the specified purchase count discount commercial article management table 68 (S103, S104, S311-S314, S320). Then, when making the settlement, if the commercial articles, which are not yet inputted by the specified count into the shopping basket, are included in the commercial articles registered in the specified purchase count discount commercial article management table 68, the scheme is such that the purport of the coupon being not yet used is displayed on the unillustrated settlement procedure screen (steps S709-S712).

Hence, according to the shop system in the embodiment, it does not happen that the purchaser forgets to apply the coupon displayed on the unillustrated coupon screen.

<Proper Reception of Reserved Commercial Article>

Further, according to the shop system in the embodiment, when the purchaser touches the commercial article button of the reserved discount commercial article in the commercial article buttons on the unillustrated coupon screen, via the procedure of inputting the secret code number, the coupon commercial article (the reserved discount commercial article) linked to the commercial article button is registered as the commercial article with the desire for receiving the application of the coupon in the purchase reserved commercial article management table 69 (S103, S104, S311, S312, S315-S320). Then, after the settlement, when the commercial article is registered in the purchase reserved commercial article management table 69, the scheme is such that the coupon is printed (steps S732-S738).

Hence, according to the shop system in the embodiment, the purchaser can receive the reserved discount commercial article displayed on the unillustrated coupon screen at the proper time without being held by others.

<<Descriptions about Units>>

In the embodiment discussed above, the respective units 50a-50h of the shopping basket device 50 and the individual units 20a-20e of the shop server device 20 may be each constructed of software components and hardware components, and may also be constructed of only the hardware components.

The software component can be exemplified by an interface program, a driver program, a table and data and by a combination of some of these components. These components may be stored on a readable-by-computer medium that will be explained later on and may also be firmware that is fixedly incorporated into a storage device such as a ROM "Read Only Memory" and an LSI "Large Scale Integration".

Moreover, the hardware component can be exemplified by an FPGA "Field Programmable Gate Array", an ASIC "Application Specific Integrated Circuit", a gate array, a combination of logic gates, a signal processing circuit, an analog circuit and other types of circuits. Among these components, the logic gate may include an AND, an OR, a NOT, a NAND, a flip-flop, a counter circuit and so on. Moreover, the signal processing circuit may include circuit elements which execute addition, multiplication, subtraction, inversion, a sum-of-products operation, differentiation and integration of signal values. Further, the analog circuit may include circuit elements which execute amplification, addition, multiplication, differentiation, integration, etc.

Note that the components building up the respective units 50a-50h of the shopping basket device 50 described above and the individual units 20a-20e of the shop server device 20 are not limited to those exemplified above but may be other components equivalent thereto.

<<Explanations about Software and Program>>

In the embodiment discussed above, the respective programs 51-53 within the shopping basket device 50, the respective tables 61, 63, 64, 66, 68, 69 in the shop server device 20, the pieces of data 62, 65, 67, the programs 71-77 and the software components described above, may each include a software component, a procedure-oriented language based component, an object-oriented software component, class software, a component managed as a task, a component managed as a process, and elements such as a function, an attribute, a procedure (Procedure), a subroutine (software routine), a fragment or segment of a program code, a driver, firmware, a microcode, a code, a code segment, an extra segment, a stack segment, a program area, a data area, data, a database, a data structure, a field, a record, a table, a matrix table, an array, a variable and a parameter.

Further, the respective programs 51-53 within the shopping basket device 50, the respective tables 61, 63, 64, 66, 68, 69 in the shop server device 20, the pieces of data 62, 65, 67, the programs 71-77 and the software components described above, may each be described in a C-language, C++, Java (trademark of Sun Microsystems in U.S.A.), Visualbasic (trademark of Microsoft Corp. in U.S.A.), Perl, Ruby and other programming languages.

Moreover, the instruction, the code and the data contained in the respective programs 51-53 within the shopping basket device 50, the respective tables 61, 63, 64, 66, 68, 69 in the shop server device 20, the pieces of data 62, 65, 67, the programs 71-77 and the software components described above, may be transmitted to or loaded into a computer and a computer incorporated into a machine or a system via a wired network card and a wired network or via a wireless card and a wireless network.

In the transmission or loading described above, the data signals flow via the wired network or the wireless network in the way of their being carried on, e.g., carrier waves (subcarriers). The data signals may also be, however, transferred intact as so-called baseband signals without depending on the carrier waves described above. These carrier waves are transmitted in an electric, magnetic or electromagnetic mode, an optical mode, an acoustic mode or other modes.

Herein, the wired network or the wireless network is a network built up by, e.g., a telephone line, a network line, a cable (including an optical cable and a metallic cable), a wireless link, a mobile phone access line, a PHS "Personal Handyphone System" network, a wireless LAN "Local Area Network", Bluetooth (trademark of the Bluetooth Special Interest Group), on-vehicle wireless type communications (DSRC "Dedicated Short Range Communication") and a network constructed of any one of those given above. Then, the data signals are used for transmitting the information including the instruction, the code and the data to a node or the component on the network.

Note that the components configuring the respective programs 51-53 within the shopping basket device 50, the respective tables 61, 63, 64, 66, 68, 69 in the shop server device 20, the pieces of data 62, 65, 67, the programs 71-77 and the software components described above, are not limited to those exemplified above and may also be other components equivalent thereto.

<<Explanation about Readable-by-Computer Medium>>

Any one of the functions in the embodiment discussed above may be coded and thus stored in a storage area on the readable-by-computer medium. In this case, the program for realizing the function can be provided to the computer or the computer incorporated into the machine or the system via the readable-by-computer medium. The computer or the computer incorporated into the machine or the system reads the program from the storage area on the readable-by-computer medium and executes the program, thereby enabling the function thereof to be realized.

Herein, the readable-by-computer medium connotes a recording medium capable of accumulating information such as the program and the data by electrical, magnetic, optical, chemical, physical or mechanical action, and retaining the information in a readable-by-computer status.

The electrical or magnetic action can be exemplified by writing the data to the element on the ROM "Read Only Memory" constructed by use of a fuse. The magnetic or physical action can be exemplified by a phenomenon of toners to form a latent image on a paper medium. Note that the information recorded on the paper medium can be read, e.g., optically. The optical and chemical action can be exemplified by forming a thin film or a rugged portion on a substrate. Incidentally, the information recorded in the ruggedness-utilized mode can be read, e.g., optically. The chemical action can be exemplified by oxidation-reduction reaction on the substrate or forming an oxide film or a nitride film on a semiconductor substrate, or a photo-resist phenomenon. The physical or mechanical action can be exemplified by forming a rugged portion on an emboss card or forming a punch-hole in the paper medium.

Moreover, in the readable-by-computer mediums, some mediums can be detachably attached to the computer or the computer incorporated into the machine or the system. The attachable/detachable readable-by-computer medium can be exemplified by a DVD (including DVD-R, DVD-RW, DVD-ROM, DVD-RAM), a +R/+WR, a BD (including BD-R, BD-RE, BD-ROM), a CD "Compact Disk" (including CD-R, CD-RW, CD-ROM), an MO "Magneto Optical" disk, other optical disk mediums, a flexible disk (including a floppy disk (Floppy is a trademark of Hitachi Ltd.)), other magnetic disk mediums, a memory card (CompactFlash (trademark of SanDisk Corp. in U.S.A.), SmartMedia (trademark of Toshiba Co., Ltd.), SD card (trademark of SanDisk Corp. in U.S.A., Matsushita Electric Industrial Co., Ltd. and Toshiba Co., Ltd.), Memory Stick (trademark of Sony Corp.), MMC (trademark of Siemens in U.S.A. and SanDisk Corp. in U.S.A.) etc), a magnetic tape and other tape mediums, and a storage device including, as a built-in component, any one of those mediums. Some of the storage devices have a built-in DRAM "Dynamic Random Access Memory" or SRAM "Dynamic Random Access Memory".

Furthermore, some of the readable-by-computer mediums are fixedly installed in the computer or the computer incorporated into the machine or the system. This type of readable-by-computer medium can be exemplified by a hard disk, a DRAM, an SRAM, a ROM, an EEPROM "Electronically Erasable and Programmable Read Only Memory" and a flash memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. A commercial article information presenting system comprising:
    a shopping basket device installed a shopping basket for putting one or more commercial articles each having an electronic tag therein, the electronic tag including a tag identifier for uniquely specifying the electronic tag; and
    a shop server capable of communicating with the shopping basket device via a network,
    the shop server including:
    a first transmitting unit to transmit, to the shopping basket device, screen data for displaying an advertisement screen indicating information with respect to discount target commercial articles and listing of selection items each containing a commercial article identifier for uniquely specifying the commercial article,
    the shopping basket device including:
    an acquiring unit to acquire the tag identifiers from the electronic tags attached to the one or more commercial articles put in the shopping basket;
    a second transmitting unit to transmit the tag identifiers acquired by the acquiring unit to the shop server;
    a display unit to display a screen based on screen data received from the shop server; and
    a third transmitting unit to transmit, in a case where any one of the selection items is chosen from the advertisement screen displayed by the display unit based on the screen data transmitted by the first transmitting unit of the shop server, the commercial article identifier contained in the chosen selection items to the shop server,
    the shop server further including:
    a storage to store commercial article information blocks per commercial article, each of the commercial article information blocks containing the commercial article identifier, a unit price of the commercial article and a tag identifier group of the electronic tags attached to identical commercial articles;
    a recording unit to record the commercial article identifier, which is contained in the chosen selection items, received from the third transmitting unit of the shopping basket device;
    a generating unit to generate, when receiving the tag identifiers of the electronic tags transmitted by the second transmitting unit, screen data for displaying an itemization screen, the itemization screen indicating commercial article identifiers and unit prices in at least one of the commercial article information blocks corresponding to the received tag identifiers and indicating a total of the unit prices, to include a description indicating that there is no commercial article corresponding to the chosen selection items in the shopping basket when the commercial article identifier recorded by the recording unit does not exist in the commercial article identifiers corresponding to the tag identifiers transmitted by the second transmitting unit of the shopping basket device; and
    a fourth transmitting unit to transmit the screen data generated by the generating unit to the shopping basket device.

2. A commercial article information presenting method in a system including a shopping basket device installed a shopping basket for putting one or more commercial articles each having an electronic tag therein, the electronic tag including a tag identifier for uniquely specifying the electronic tag, and a shop server capable of communicating with the shopping basket device via a network, the method comprising:
    transmitting, from the shop server to the shopping basket device, screen data for displaying an advertisement screen indicating information with respect to discount target commercial articles and listing of selection items each containing a commercial article identifier for uniquely specifying the commercial article;
    acquiring, at the shopping basket device, the tag identifiers from the electronic tags attached to the one or more commercial articles put in the shopping basket;
    transmitting the acquired tag identifiers from the shopping basket device to the shop server;
    displaying, at the shopping basket device, a screen based on screen data received from the shop server;
    transmitting, from the shopping basket device to the shop server, the commercial article identifier contained in one of selection items chosen from the advertisement screen displayed at the shopping basket device based on the screen data transmitted by the shop server;
    storing, at the shop server, commercial article information blocks per commercial article, each of the commercial article information blocks containing the commercial article identifier, a unit price of the commercial article and a tag identifier group of the electronic tags attached to identical commercial articles;
    recording, at the shop server, the commercial article identifier contained in the chosen selection items received from the shopping basket device;
    generating, at the shop server, when receiving the tag identifiers of the electronic tags transmitted by the shopping basket device, screen data for displaying an itemization screen, the itemization screen indicating commercial article identifiers and unit prices in at least one of the commercial article information blocks corresponding to the received tag identifiers and indicating a total of the unit prices, to include a description indicating that there is no commercial article corresponding to the chosen selection items in the shopping basket when the recorded commercial article identifier does not exist in the commercial article identifiers corresponding to the tag identifiers transmitted by the shopping basket device; and
    transmitting the generated screen data from the shop server to the shopping basket device.

* * * * *